(12) United States Patent
Fishman

(10) Patent No.: US 8,212,408 B2
(45) Date of Patent: Jul. 3, 2012

(54) COLLECTION OF ELECTRIC POWER FROM RENEWABLE ENERGY SOURCES VIA HIGH VOLTAGE, DIRECT CURRENT SYSTEMS WITH CONVERSION AND SUPPLY TO AN ALTERNATING CURRENT TRANSMISSION NETWORK

(75) Inventor: Oleg S. Fishman, Maple Glen, PA (US)

(73) Assignee: Alencon Acquisition Co., LLC., Plymouth Meeting, PA (US)

( * ) Notice: Subject to any disclaimer, the term of this patent is extended or adjusted under 35 U.S.C. 154(b) by 122 days.

(21) Appl. No.: 12/543,338

(22) Filed: Aug. 18, 2009

(65) Prior Publication Data

US 2010/0156189 A1    Jun. 24, 2010

Related U.S. Application Data

(63) Continuation-in-part of application No. 12/434,641, filed on May 2, 2009.

(60) Provisional application No. 61/140,839, filed on Dec. 24, 2008.

(51) Int. Cl.
*H02M 5/00* (2006.01)
*H02M 5/40* (2006.01)

(52) U.S. Cl. ............. 307/77; 307/43; 307/82; 307/83; 307/84

(58) Field of Classification Search .......... 307/43, 307/77, 82–84
See application file for complete search history.

(56) References Cited

U.S. PATENT DOCUMENTS

| | | | |
|---|---|---|---|
| 4,135,489 A * | 1/1979 | Jarvinen | 126/648 |
| 7,071,579 B2 * | 7/2006 | Erdman et al. | 290/55 |
| 7,091,707 B2 * | 8/2006 | Cutler | 323/268 |
| 7,095,128 B2 * | 8/2006 | Canini et al. | 290/44 |
| 7,391,126 B2 * | 6/2008 | Liu et al. | 290/44 |
| 7,411,309 B2 * | 8/2008 | Hudson | 290/44 |
| 7,476,987 B2 * | 1/2009 | Chang | 290/55 |
| 7,479,774 B2 * | 1/2009 | Wai et al. | 323/284 |
| 7,514,900 B2 * | 4/2009 | Sander et al. | 320/101 |
| 7,808,126 B2 * | 10/2010 | Stiesdal | 307/84 |
| 7,859,867 B2 * | 12/2010 | Boeke | 363/41 |
| 7,919,953 B2 * | 4/2011 | Porter et al. | 323/222 |
| 2006/0044853 A1 * | 3/2006 | Oswald et al. | 363/72 |
| 2006/0162772 A1 * | 7/2006 | Presher et al. | 136/290 |
| 2006/0174939 A1 * | 8/2006 | Matan | 136/293 |
| 2007/0035975 A1 * | 2/2007 | Dickerson et al. | 363/131 |
| 2007/0133241 A1 * | 6/2007 | Mumtaz et al. | 363/131 |
| 2008/0062724 A1 * | 3/2008 | Feng et al. | 363/17 |
| 2008/0097655 A1 * | 4/2008 | Hadar et al. | 700/286 |
| 2008/0150366 A1 * | 6/2008 | Adest et al. | 307/77 |
| 2008/0164766 A1 * | 7/2008 | Adest et al. | 307/80 |
| 2008/0238195 A1 * | 10/2008 | Shaver et al. | 307/18 |

(Continued)

*Primary Examiner* — Adi Amrany
(74) *Attorney, Agent, or Firm* — Philip O. Post

(57) ABSTRACT

Wind-generated electric power is collected in a multiple nodal arrangement where the DC output current of each node can be held constant while the DC output node voltage is allowed to vary. The DC outputs from the wind-generated power collection nodes are connected together in series and fed to a plurality of regulated current source inverters via a high voltage DC transmission link. Each inverter converts input DC power into a three phase AC output. The AC outputs of the regulated current source inverters are connected to a phase shifting transformation network that supplies three phase electric power to a conventional AC electrical transmission system. Alternatively wind-generated and photovoltaic-generated electric power is commonly collected in a nodal arrangement and transported at high voltage DC to a plurality of regulated current source inverters for supply to the conventional AC electrical transmission system.

6 Claims, 19 Drawing Sheets

U.S. PATENT DOCUMENTS

| | | | |
|---|---|---|---|
| 2009/0140577 A1* | 6/2009 | Fishman | 307/82 |
| 2009/0141522 A1* | 6/2009 | Adest et al. | 363/55 |
| 2009/0147554 A1* | 6/2009 | Adest et al. | 363/71 |
| 2009/0283129 A1* | 11/2009 | Foss | 136/244 |
| 2009/0284240 A1* | 11/2009 | Zhang et al. | 323/285 |
| 2010/0026097 A1* | 2/2010 | Avrutsky et al. | 307/43 |
| 2010/0027297 A1* | 2/2010 | Avrutsky et al. | 363/21.12 |
| 2010/0051086 A1* | 3/2010 | Keshner et al. | 136/246 |
| 2010/0089434 A1* | 4/2010 | Fishman | 136/246 |
| 2010/0252088 A1* | 10/2010 | Fein et al. | 136/244 |
| 2010/0308662 A1* | 12/2010 | Schatz et al. | 307/80 |
| 2010/0327584 A1* | 12/2010 | Fortmann | 290/44 |

* cited by examiner

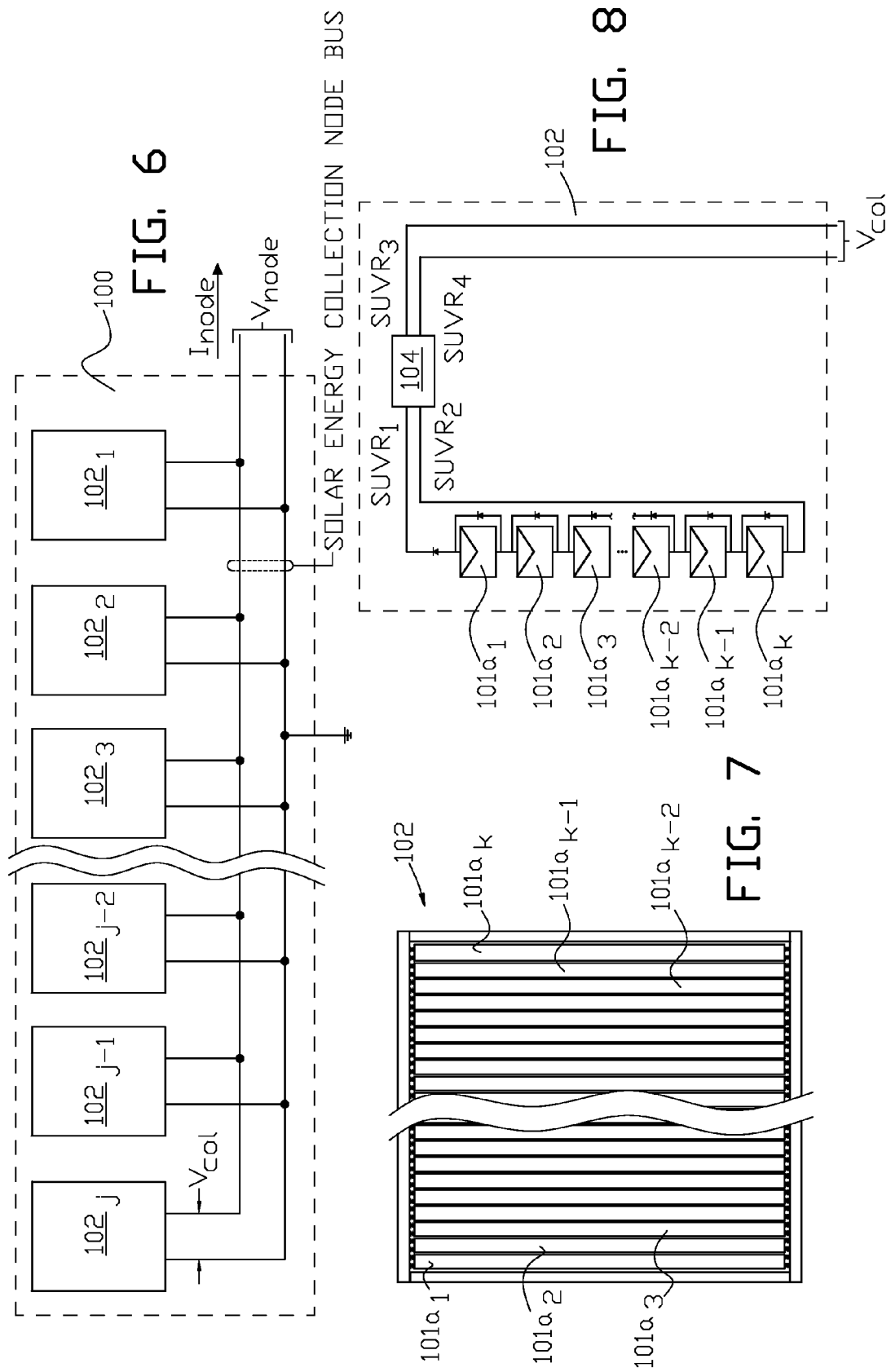

① $SW_1$ AND $SW_4$ CLOSED
  $SW_2$ AND $SW_3$ OPEN
② $SW_1$ AND $SW_4$ OPEN
  $SW_2$ AND $SW_3$ CLOSED
③ $SW_1$ AND $D_3$ CONDUCTING
  OR $SW_2$ AND $D_4$ CONDUCTING
  OR $SW_3$ AND $D_1$ CONDUCTING
  OR $SW_4$ AND $D_2$ CONDUCTING

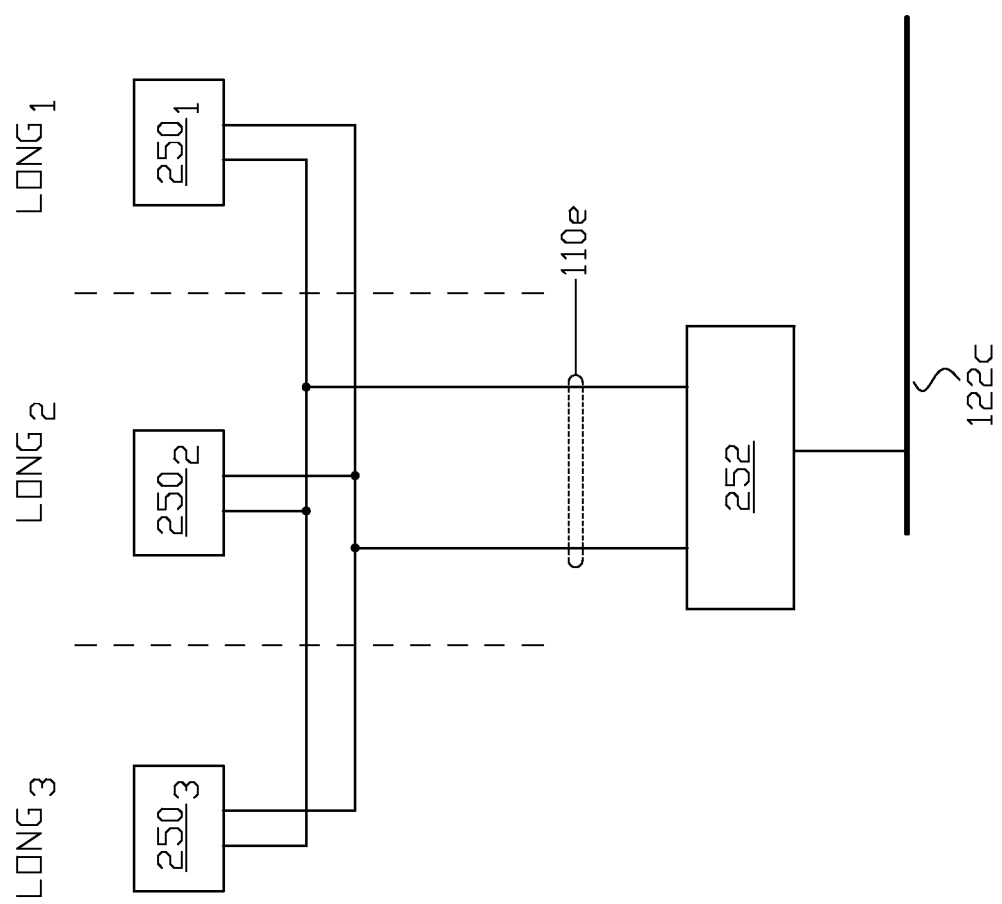

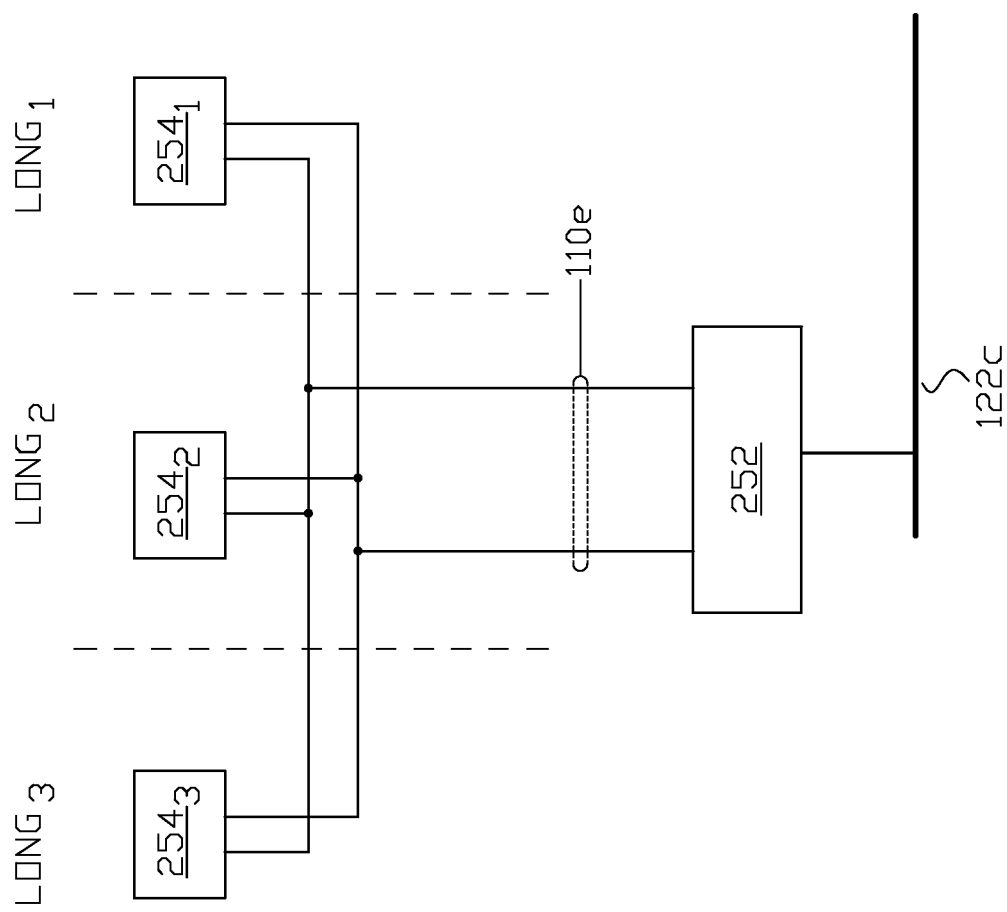

US 8,212,408 B2

COLLECTION OF ELECTRIC POWER FROM RENEWABLE ENERGY SOURCES VIA HIGH VOLTAGE, DIRECT CURRENT SYSTEMS WITH CONVERSION AND SUPPLY TO AN ALTERNATING CURRENT TRANSMISSION NETWORK

CROSS-REFERENCE TO RELATED APPLICATIONS

This application is a continuation-in-part of U.S. application Ser. No. 12/434,641 filed May 2, 2009, which claims the benefit of U.S. Provisional Application No. 61/140,839, filed Dec. 24, 2008, both of which applications are hereby incorporated by reference in their entirety.

FIELD OF THE INVENTION

The present invention relates to the collection of electric power from renewable energy sources via a high voltage (HV) direct current (DC) system, conversion of the DC power into alternating current (AC) power, and supply of the AC power to an electric power transmission network.

BACKGROUND OF THE INVENTION

Renewable electric energy sources include DC electric power sources, such as photovoltaic modules and wind turbine generators that are co-located and electrically interconnected in large numbers to form solar and wind farms or power plants.

Typically megawatt and larger capacity solar photovoltaic (PV) power plants comprise a large number of solar PV power collectors, such as solar PV modules, that supply DC electric power to collocated DC to AC inverters, which convert the DC power into AC electric power. The term "solar farm" is sometimes used to describe the large number of solar PV power collectors and inverters that can be used to collect solar photovoltaic power. The inverted AC electric power is typically injected into an electric power transmission network (grid) that is located within a few miles from the AC output terminals of the inverters. For example with reference to FIG. 1(a), multiple strings 901 of PV solar cells formed from a plurality of serially connected solar photovoltaic modules 902 are interconnected in parallel to form solar farm 904 to provide a low DC voltage (nominally less than 1,000 volts) input to DC-to-AC inverters 906 that output low AC voltage (nominally in the range of 300 to 600 volts). The inverters' output voltages are transformed to at least medium AC voltage (nominally in the range of 13.4 to 39.4 kilovolts) and supplied to transmission transformer 908 that raises the voltage to the high voltage range (nominally from 169 to 345 kilovolts) for interconnection to an AC transmission network 122 or "grid."

A disadvantage of the above conventional solar farm is that the large number of solar PV power collectors needed to collect a megawatt or greater quantity of DC electric power requires a significant contiguous area for mounting of the collectors. This area can extend for many acres. Consequently sighting constraints for a typical megawatt or larger solar farm is a large contiguous area that is near the AC grid into which the converted DC power is to be injected.

A wind power plant comprises a large number of electrically interconnected wind turbine generators that are capable of generating, in aggregate, kilowatts or megawatts of electric power. Typically, as diagrammatically illustrated in FIG. 1(b), wind turbine driven generator assembly 802 comprises wind turbine WT with its output shaft suitably coupled, for example, by a (speed multiplier) gearbox GB, to an electric generator G. Various types of generator systems can be coupled to a wind turbine. One such system is known as a Type 4 industry designated wind turbine generator power system where generator G is a synchronous generator having a variable frequency, variable voltage output that is supplied to (active or passive) rectifier 804 with the rectified output dc link supplied to DC to AC inverter 910. Inverter 910 is a typical prior art, three phase, switch mode voltage source inverter. The inverter comprises three branches, each with two switching devices (SW1 and SW2; SW3 and SW4; or SW5 and SW6) in each branch. The switching device utilized in the switch mode voltage source inverter may be any type of controllable, unidirectional conduction semiconductor device, for example, a bipolar junction transistor (BJT); a metal-oxide-semiconductor field-effect transistor (MOSFET); an insulated-gate bipolar transistor (IGBT); a gate turn-off thyristor (GTO); or a gate commutated thyristor (GCT). Each switching device is shunted with an anti-parallel diode (D1 through D6). DC voltage input to the switch mode voltage source inverter is from the rectified output of wind turbine driven generator assembly 802. Smoothing capacitor $C_{dc}$ stabilizes the input dc voltage while the dc current instantaneously changes through each half cycle of the inverter output frequency. The switching devices are modulated by sequentially switching them from the conduction (on) to non-conduction (off) states at a high rate of several kilohertz, so that the inverter output current, after passing through ac low pass filter 912, will be close to an ideal sinusoidal waveform. The inverter output current is then transformed through line transformer 914, which electrically isolates the inverter output from grid 916 and transforms the inverter output voltage level to the grid voltage level. Current supplied to the grid feeds load $R_{load}$ and, therefore, reduces the burden on grid power sources $V_{ac}$, which supply power through grid impedance $Z_{line}$.

Generally the rectification from variable frequency, variable voltage AC to DC power is accomplished local to the wind turbine. The combination of wind turbine WT, gear box GB and generator G may be referred to as a wind turbine driven generator assembly 802, as shown in FIG. 1(b), and if the generator is an AC generator with its AC output rectified by AC to DC rectifier 804, the output of the rectifier represents an unstable dc source that is similar in many aspects to the photovoltaic-generated unstable dc power generated by a photovoltaic array, and consequently, subject to many of the same limitations. Wind farm 850 may comprise multiple combinations of wind turbine driven generator assembly 802 and AC to DC rectifier 804, as shown in FIG. 1(c), with the output of each AC to DC rectifier 804 connected to the input of a separate DC to AC inverter 910 and transformed to medium voltage level, with further transformation and power delivery to grid 122 in a manner similar to that described above for photovoltaic-generated power.

As with a solar farm as described above, a wind farm requires a significant contiguous area for the wind turbine generators and associated support equipment. Typically a wind farm is located a significant distance from populated areas because of noise pollution due to low frequency air turbulence and mechanical vibrations from the wind turbine driven generator assembly, which means the wind farm may be located a significant distance from the AC grid into which the wind-generated power is injected.

One object of the present invention is to provide an arrangement of apparatus for, and method of, efficiently collecting solar photovoltaic DC electric power from multiple groups of solar PV power collectors that are not required to be collocated with each other, or with the inverters that convert the DC electric power into AC power for injection into an electric power transmission network.

It is another example of the present invention to provide an arrangement of apparatus for, and method of, efficiently collecting wind-generated DC electric power from wind-generated electric power collection nodes, each comprising a wind turbine driven AC generator and AC to DC rectifier, that are not required to be collocated with each other, or with the inverters that convert the DC electric power into AC power for injection into an electric power transmission network.

It is another example of the present invention to provide an arrangement of apparatus for, and method of, efficiently collecting DC electric power from a combination of photovoltaic and wind renewable energy sources utilizing multiple groups of DC electric power collectors that are not required to be collocated with each other, or with the inverters that convert the DC electric power into AC power for injection into an electric power transmission network.

BRIEF SUMMARY OF THE INVENTION

In one aspect the present invention is apparatus for, and method of, collecting at least one megawatt of wind-generated electric power and delivering the wind-generated electric power to an AC transmission network or grid. At least one high voltage DC source is provided for generating the wind-generated electric power. In all examples of the invention the high voltage DC source may be a wind turbine driven generator having a rectified DC output, which collectively may be referred to as a wind-generated power collection node. In all examples of the invention the electric potential across the total output of all high voltage DC sources is at least 15 kilovolts. At least one DC to AC inverter is provided with all inverter DC inputs connected to all outputs of the high voltage DC sources by a high voltage DC power transmission link. The inverter AC outputs of the inverters are connected, for example, via phase shifting transformation networks, or transformers, to the AC transmission network to deliver, or inject, the megawatt of wind-generated electric power into the AC transmission network. The inverters may have a regulated current source inverter topology in some examples of the invention with the AC outputs of the inverters arranged to form at least one three-phase alternating current supply where each phase of the three-phase supply has a stepped waveform, and the AC output supply from the inverters is voltage synchronized with the AC transmission network's voltage. In some examples of the invention the high voltage DC source may comprise a group of the wind-generated electric power collection nodes with each node's output connected to a node isolated step-down current regulator. The regulator provides a high voltage DC regulated current output from each of the collection nodes with the total electric potential across the outputs of all the current regulators being at least 15 kilovolts. The outputs of all the current regulators can be serially interconnected to form a series string high voltage DC regulated current circuit across which the total electric potential is established. The DC inputs of all inverters may be serially interconnected to form a series string inverter DC input circuit that can be connected across the series string high voltage DC regulated current circuit to form a high voltage DC power loop circuit.

In another aspect, the present invention is a method of collecting at least one megawatt of wind-generated DC electric power and delivering the at least one megawatt of wind-generated electric power to an AC transmission network. The wind-generated DC electric power is generated from multiple wind-generated electric power collection nodes with each of the wind-generated electric power collection nodes having a high voltage DC output. The high voltage DC output of each wind-generated power collection node is individually current regulated, and the one megawatt of DC power is transported as regulated current at an electric potential of at least 15 kilovolts from the high voltage DC outputs of all of the wind-generated electric power collection nodes to the DC input of at least one DC to AC inverter. The megawatt of DC power is converted to AC electric power in the inverters and the AC electric power is injected, or delivered from the inverters to the AC transmission network. The DC regulated currents from the high voltage DC outputs of all wind-generated electric power connection nodes can be serially interconnected to form a series string high voltage DC regulated current circuit having the electric potential of at least 15 kilovolts. Each wind-generated electric power collection node can be electrically isolated from the series string high voltage DC regulated current circuit.

In another aspect the present invention is apparatus for, and method of, collecting at least one megawatt of DC electric power from a combination of solar photovoltaic high voltage DC sources and wind-generated high voltage DC sources, and delivering the DC electric power to an AC transmission network or grid. A solar photovoltaic high voltage DC source may be formed from solar photovoltaic modules interconnected in a series string circuit that is connected to the input of a step-up voltage regular. The combination of interconnected solar photovoltaic modules and step-up voltage regulator can form a solar photovoltaic power collector, and a group of solar photovoltaic power collectors can form a solar photovoltaic power collection node. A wind-generated high-voltage DC source may be formed from at least one wind turbine driven AC generator having a DC output, which can be referred to a wind-generated power collection node. Outputs of the solar photovoltaic and wind-generated power collection nodes can each be connected to the input of a dedicated node isolated step-down current regulator. A series string high voltage DC series circuit can be formed from a serial interconnection of the outputs of all dedicated node isolated step-down current regulators.

The above and other aspects of the invention are further set forth in this specification and the appended claims.

BRIEF DESCRIPTION OF THE DRAWINGS

The appended drawings, as briefly summarized below, are provided for exemplary understanding of the invention, and do not limit the invention as further set forth in this specification and the appended claims:

FIG. 6 illustrates one example of a plurality of solar power collectors forming a solar power collection node used in one example of the present invention;

FIG. 7 is one example of a physical arrangement of a solar power collector used in the present invention;

FIG. 8 is a simplified electrical schematic of one example of a solar power collector of the present invention;

FIG. 23 is an arrangement of apparatus used in another example of the present invention for solar photovoltaic DC power collection, conversion of the collected DC power to AC power and supply of AC power to an AC electric transmission network; and FIG. 24 is an arrangement of apparatus used in another example of the present invention for wind-generated DC power collection, conversion of the collected DC power to AC power and supply of AC power to an AC electric transmission network.

DETAILED DESCRIPTION OF THE INVENTION

Figure 2:
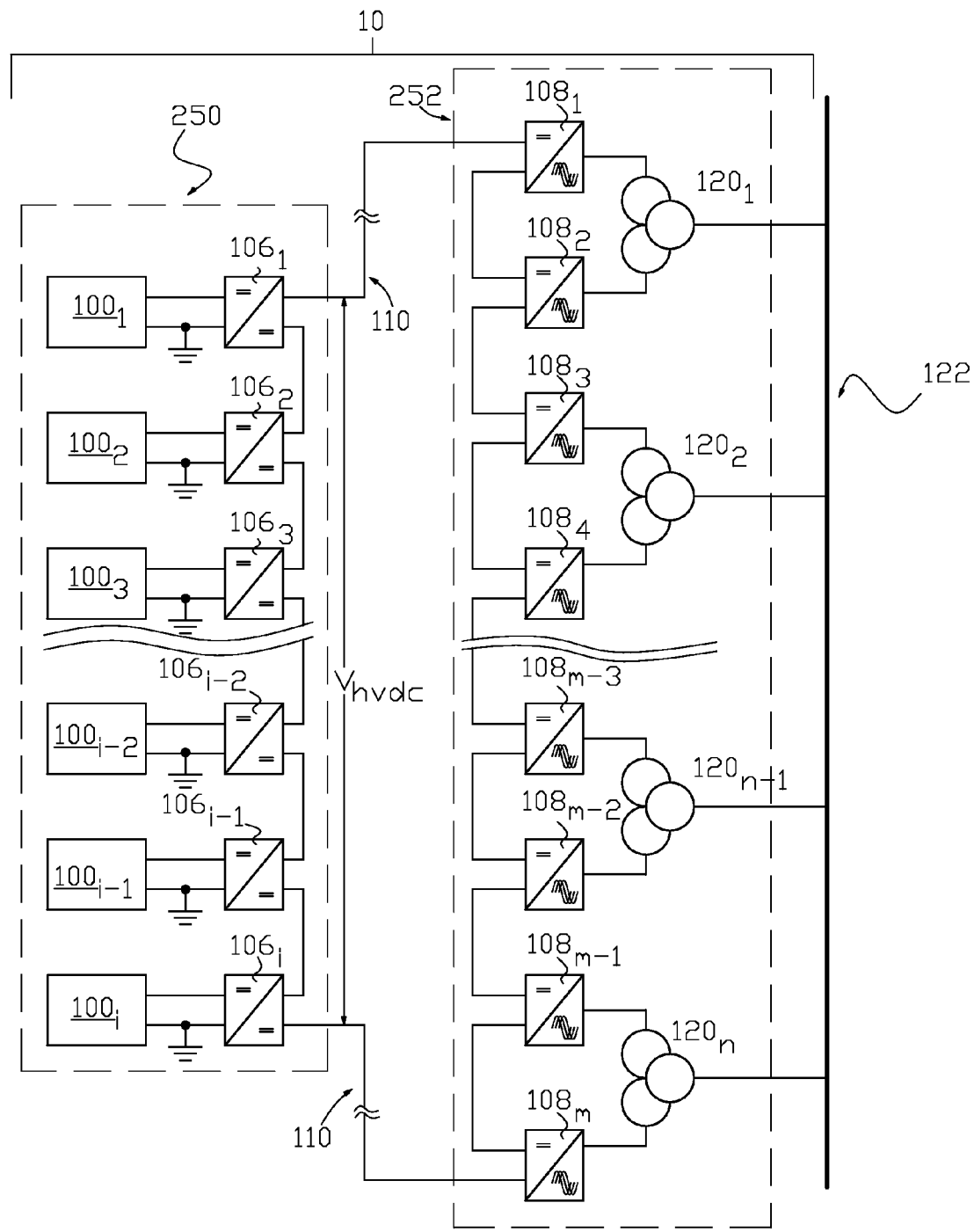
FIG. 2 is one example of an arrangement of apparatus of the present invention for solar photovoltaic DC power collection, conversion of the collected DC power to AC power, and supply of the AC power to an AC transmission network or grid.

FIG. 2 illustrates one example of an arrangement of apparatus 10 of the present invention for solar photovoltaic DC power collection, conversion to AC power, and supply of the AC power to a transmission network. Solar power collection nodes $100_1$ through $100_i$ are each connected to a respective node-isolated step-down current regulator $106_1$ through $106_i$, where "i" is a positive integer. Each solar power collection node (generally referred to by reference number 100) comprises a plurality of solar PV power collectors $102_1$ through $102_j$ having their DC outputs, $V_{col}$, connected together in parallel as shown in FIG. 6. The variable "j" may be any positive integer, and can be a different integer value for the plurality of solar PV power collectors in each distinct solar power collection node 100. A typical solar PV power collector (generally referred to by reference number 102) is illustrated in non-limiting physical and electrical schematic form in FIG. 7 and FIG. 8 respectively. Referring to FIG. 7, in this particular non-limiting example of the invention, each solar PV power collector 102 comprises an array of serially connected solar photovoltaic modules $101a_1$ through $101a_k$ that has its array output connected to collector step-up voltage regulator 104. The variable "k" may be any positive integer, and can be a different integer value for the plurality of solar photovoltaic modules in each distinct solar PV power collector 102. Consequently the DC output voltage, $V_{node}$, of each solar power collection node (and each solar power collector 102), is held relatively constant while the DC output current, $I_{node}$, of each solar power collection node and solar PV power collector varies in accordance with the instantaneous "maximum power point" or "MPP" for each solar PV power collector ($102_1$ through $102_j$) making up a solar power collection node. The MPP is defined as the point at which a solar cell can deliver maximum electrical power (maximum voltage multiplied by current) for a given irradiation level and electrical load applied to the solar cell. Without output voltage equalization for each solar PV power collector making up a solar power collection node, the instantaneous DC output voltage, $V_{col}$, of a collector may vary over a range (for example, between 300 V and 620) depending upon the instantaneous incident level of illumination (irradiation) on the solar cells making up the solar PV power collectors 102 in a solar power collection node. The term "photovoltaic module" is used herein in the broadest sense to define one or more solar cells contained in any type of enclosure such as, but not limited to, what is commonly known as a photovoltaic module.

Figure 9:
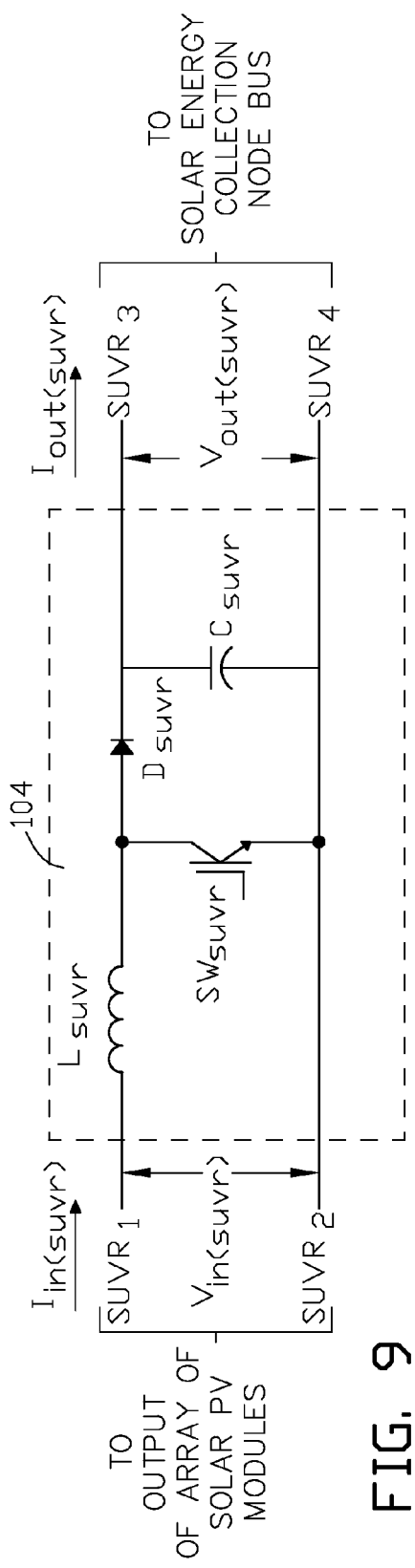
FIG. 9 is a simplified schematic of one example of a step-up voltage regulator used with a series array of solar photovoltaic modules making up a solar power collector used in the present invention.

One typical, non-limiting scheme for implementing step-up voltage regulation in a solar PV power collector is the step-up voltage regulator (SUVR) 104 shown in FIG. 9. Input terminals $SUVR_1$ and $SUVR_2$ are connected across the output of the series array of solar PV modules making up a solar PV power collector. Switching device $SW_{suvr}$ periodically connects inductive energy storage device $L_{suvr}$ across the output of the series array of PV modules. Energy storage device $L_{suvr}$ (such as an inductor) stores energy that is transferred to capacitive energy storage device $C_{suvr}$ (such as a capacitor) via diode $D_{suvr}$. The relationship between the output voltage, $V_{out(suvr)}$, and input voltage, $V_{in(suvr)}$, of the SUVR is defined by the following equation:

$$V_{out(suvr)} = \frac{1}{\Delta} \cdot V_{in(suvr)}, \quad \text{[equation (1)]}$$

where $\Delta$ is defined as the duty cycle of the SUVR in the following equation:

$$\Delta = \frac{T_{period} - T_{charge}}{T_{period}}, \quad \text{[equation (2)]}$$

where $T_{charge}$ is equal to the period of time for storing energy in the inductive energy storage device, $L_{suvr}$, and $T_{period}$ is equal to the time period of repetition of the charging cycles. The relationship between output current, $I_{out(suvr)}$, and input current, $I_{in(suvr)}$, of the step-up voltage regulator is defined by the following equation:

$$I_{out(suvr)} = I_{in(suvr)} \bullet \Delta \quad \text{[equation (3)]},$$

and the relationship between output power, $P_{out(suvr)}$ and input power, $P_{in(suvr)}$ of the step-up voltage regulator can be defined by the following equations:

$$P_{out(suvr)} = (I_{out(suvr)} \bullet V_{out(suvr)}) = P_{in(suvr)} = (I_{in(suvr)} \bullet V_{in(suvr)}) \quad \text{[equation (4)]}.$$

Figure 12:
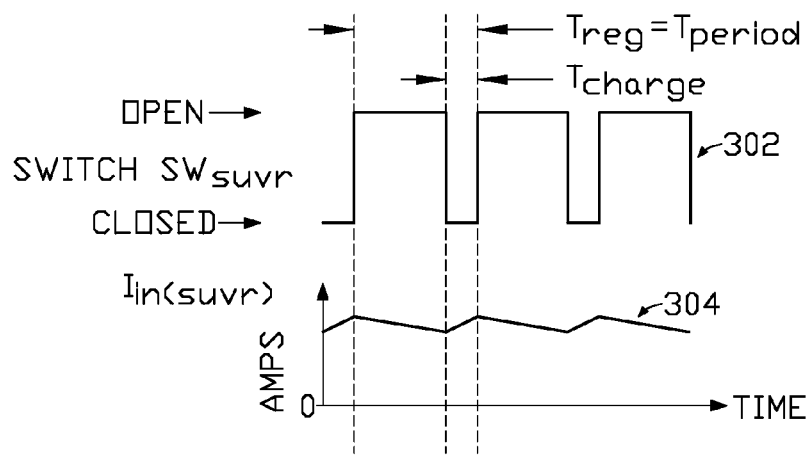
FIG. 12 illustrates waveforms relevant to the operation of the step-up voltage regulator schematically represented in FIG. 9.

The waveforms in FIG. 12 illustrate various features of the SUVR simplified schematic shown in FIG. 9. In FIG. 12 each regulation time period ($T_{reg}$), is a multiple of one-sixth of the line voltage time period of the grid 122, to minimize the ripple effect on the output currents of inverters 108; that is, the regulation time period can be $\frac{1}{6}^{th}, \frac{1}{12}^{th}, \frac{1}{18}^{th} \ldots$ of the grid's line voltage time period, which is 167 milliseconds for a nominal 60 Hertz grid, or 200 millisecond for a nominal 50 Hertz grid. During each regulation period ($T_{reg}$) switch $SW_{suvr}$ is closed for a "charge" time period ($T_{charge}$), and open for the remainder of the regulation period as illustrated by waveform 302 in FIG. 12. When switch $SW_{suvr}$ is closed, inductor $L_{suvr}$ stores energy supplied by an increasing DC current as illustrated by the regions of waveform 304 with a positive slope. When switch $S_{suvr}$ is open, stored energy in inductor $L_{suvr}$ flows to capacitor $C_{suvr}$, as illustrated by regions of waveform 304 with a negative slope, to store charge energy in the capacitor. This arrangement allows inductor $L_{suvr}$ to charge capacitor $C_{suvr}$ to a voltage level greater than the instantaneous SUVR input DC voltage level, and allows continuous operation of the SUVR, as defined by the MPP, when the instantaneous SUVR input DC voltage level, $V_{in(suvr)}$, is below the operating DC voltage input to inverters 108 as required to inject AC current onto grid 122. The current supplied at the output of the SUVR is controlled by the duty cycle ratio of switch $SW_{suvr}$ closed time period ($T_{charge}$) to the switch $SW_{suvr}$ open time period or, in other words, by the amount of energy stored in, and discharged from, inductor $L_{suvr}$.

The SUVR circuit shown in FIG. 9 is one non-limiting example of a circuit that can be used as a SUVR in the present invention to perform the function of a step-up voltage regulator as described above.

Therefore step-up voltage regulator 104 converts an unstable DC voltage source comprising an array of solar PV modules into a stable DC voltage source operating at the MPP. The duty cycle of a SUVR can periodically be adjusted in each regulation period for each solar energy collector to achieve maximum $P_{out(suvr)}$, which is equal to the sum of the power levels at the MPP for the solar cells in the solar power collector.

As shown in FIG. 2 the output of each solar power collection node is connected to a respective node-isolated step-down current regulator $106_1$ through $106_i$. The outputs of all step-down current regulators are connected in a series array to provide a higher DC voltage level that is fed into the inputs of the series of regulated current source inverters $108_1$ through $108_m$, (generally referred to by reference number 108), where "m" is an even integer equal to two or larger in this non-limiting example of the invention. The output of each step-down current regulator is electrically isolated from its input to allow each solar power collection node 100 to be connected (referenced) to electrical ground potential, for example as shown in FIG. 2, while the output of each step-down current regulator 106 in the series of current regulators is referenced to the summed output voltages of all preceding current regulators in the series. For example the output voltage of current regulator $106_3$ is added to the sum of the output voltages of current regulators $106_1$ and $106_2$. Since the outputs of the series of step-down current regulators are connected in series, the output string current of all the regulators will be equal.

Figure 10:
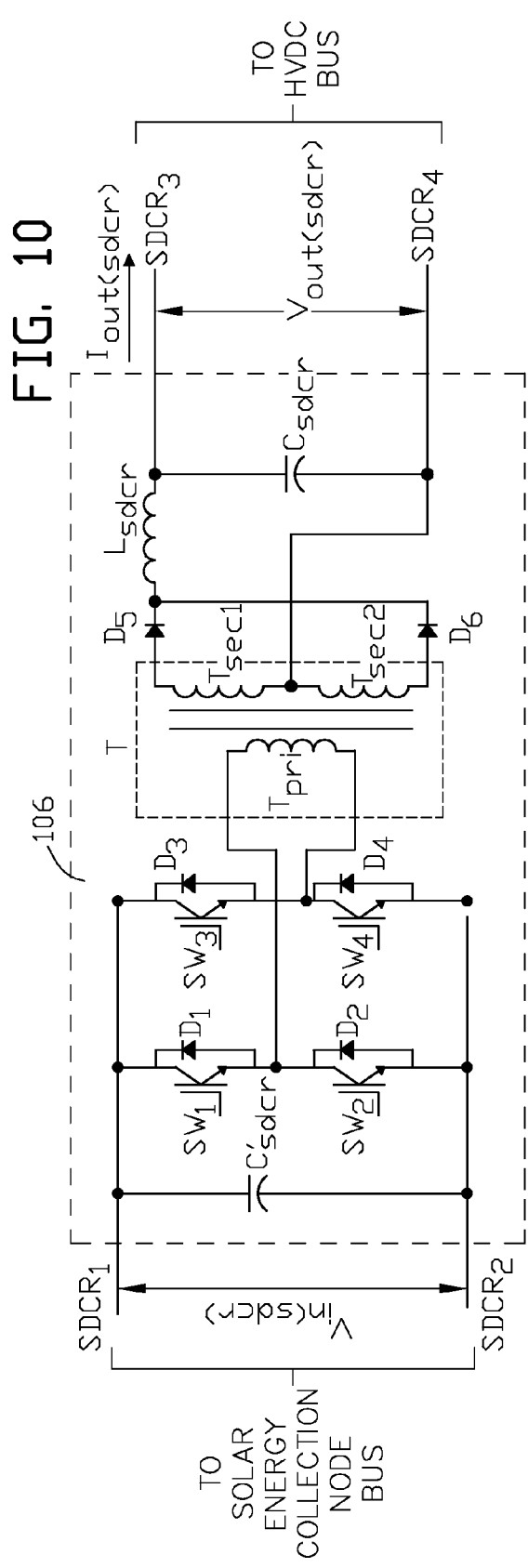
FIG. 10 is a simplified schematic of one example of a node-isolated step-down current regulator utilized in photovoltaic-generated or wind-generated electric power collection nodes in some examples of the present invention.
Figure 11:
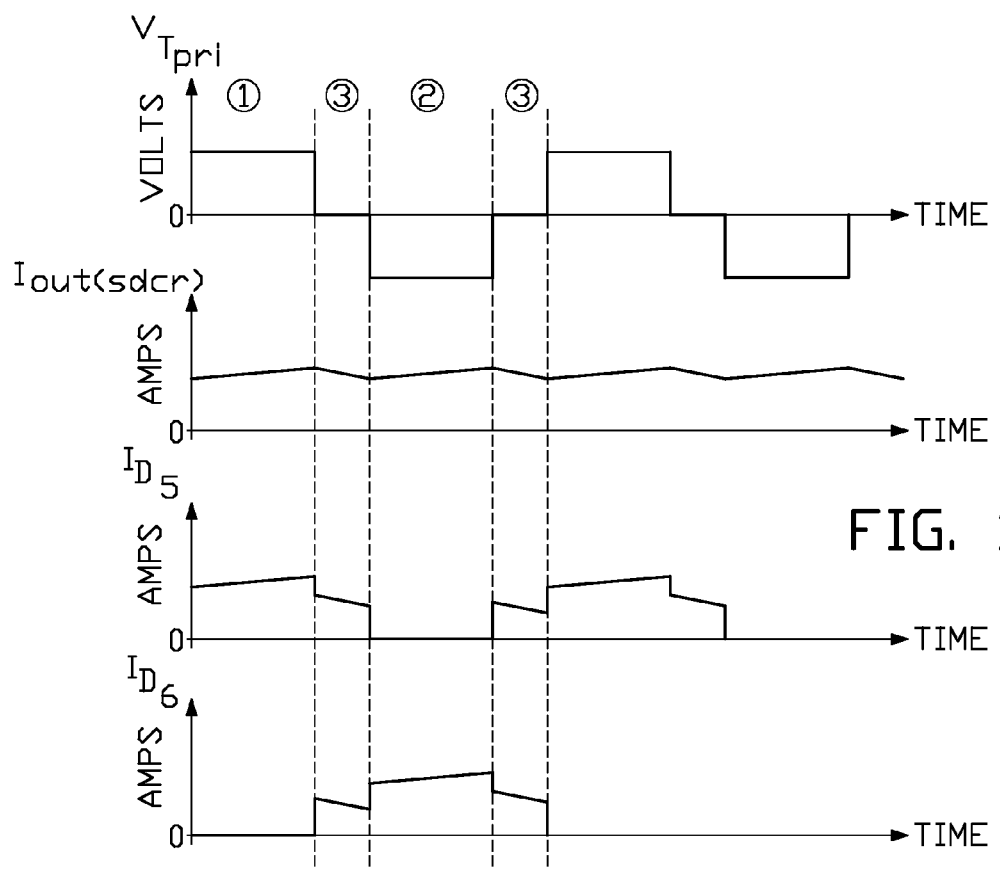
FIG. 11 illustrates waveforms relevant to the operation of the node-isolated step-down current regulator schematically represented in FIG. 10.

One typical, non-limiting scheme for implementing step-down current regulation in the node-isolated step-down current regulator 106 is illustrated in FIG. 10. Input terminals $SDCR_1$ and $SDCR_2$ are connected across the output of a solar power collection node 100. Switching devices $SW_1$ through $SW_4$, with respective anti-parallel diodes $D_1$ through $D_4$, form a full wave bridge inverter that periodically connects, in an alternating pattern, the primary winding, $T_{pri}$, of transformer T to the input terminals of the SDCR. When switching device pair $SW_1$ and $SW_4$ conduct, the voltage across the primary winding of transformer T is positive causing diode $D_5$ to conduct, and establish a current ($I_{out(sdcr)}$) flow path from the electrically isolated output $SDCR_4$ of the step-down current regulator through transformer secondary winding $T_{sec1}$, diode $D_5$, and inductive energy storage device $L_{sdcr}$ to the electrically isolated output $SDCR_3$. When switching device pair $SW_2$ and $SW_3$ conduct, the voltage across the primary winding of transformer T is negative causing diode $D_6$ to conduct, and establish a current flow path from the electrically isolated output $SDCR_4$ of the step-down current regulator through transformer secondary winding $T_{sec2}$, diode $D_6$, and inductive energy storage device $L_{sdcr}$ to the electrically isolated output $SDCR_3$ of the step-down current regulator. When either switching device $SW_1$ or $SW_2$ is not conducting, the voltage across primary winding $T_{pri}$ is zero, and both $D_5$ and $D_6$ share current and establish a current flow path from the electrically isolated output $SDCR_4$ of the step-down current regulator through both transformer secondary windings $T_{sec1}$ and $T_{sec2}$, diodes $D_5$ and $D_6$, and inductive energy storage device $L_{sdcr}$ to the electrically isolated output $SDCR_3$. The waveforms in FIG. 11 illustrate various features of the SDCR shown in FIG. 10. The regulation period for an SDCR is preferably the same as that for the SUVR as described above.

The SDCR circuit shown in FIG. 10 is one non-limiting example of a circuit that can be used as a SDCR to perform the function of a step-down current regulator as described above.

The DC output current $I_{out(sdcr)}$ as shown in FIG. 10 of each node-isolated step-down current regulator 106 is held relatively constant in magnitude that is equal to the common string current, while the DC output voltage $V_{out(sdcr)}$ varies in accordance with the power input to a step-down current regulator. All step-down current regulators $106_1$ through $106_i$ have their outputs connected together in series as shown in FIG. 2, and supply DC power to the inputs of regulated current source inverters (RCSI) $108_1$ through $108_m$, with all of the RCSI inputs connected together in series via high voltage DC transmission link 110. HVDC transmission link 110 may comprise any combination of overhead lines (shielded or unshielded), underground cables and/or submarine cables. HVDC transmission lines can cover significantly greater distances than comparable AC transmission lines since HVDC transmission line losses per unit length are reduced to about two-thirds of a comparable AC system. Factors including reduced line losses, reduced conductor sizing, reduced right-of-way and tower sizing economically favor HVDC overhead lines over comparable AC lines for distances generally greater than 500 kilometers, and HVDC cables for distances greater than 50 kilometers.

Figure 13:
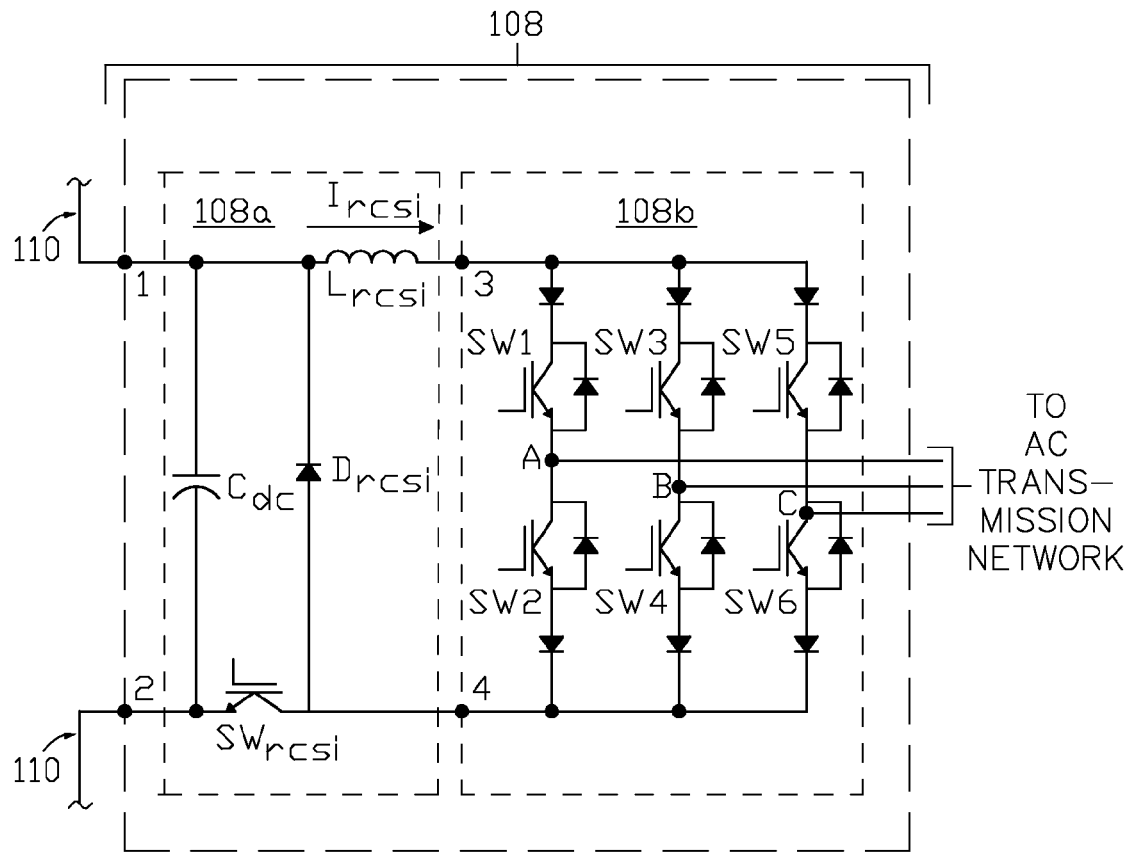
FIG. 13 is a simplified schematic representation of one example of a type of regulated current source inverter used in some examples of the present invention.
Figure 14:
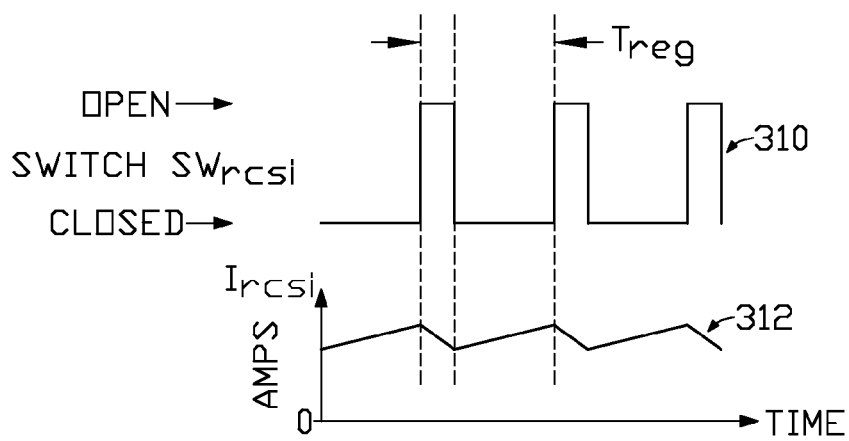
FIG. 14 illustrates waveforms relevant to the operation of the regulated current source inverter schematically represented in FIG. 13.

A typical schematic for each RCSI used in this non-limiting example of the invention is shown in FIG. 13. Each RCSI comprises step-down current regulator 108a and inverter 108b. Step-down current regulator 108a serves as a step-down current regulator when the voltage inputted to an RCSI (at points 1 and 2) rises significantly above the operating DC voltage for the RCSI to output current for injection into the grid. The waveforms in FIG. 14 illustrate various features of the RCSI shown in FIG. 13. During each regulation time period, $T_{reg}$, switch $SW_{resi}$ in FIG. 13 is closed for a "store energy" time period and open for the remainder of the regulation time period as illustrated by waveform 310 in FIG. 14. When switch $SW_{resi}$ is closed, inductor $L_{resi}$ stores energy supplied by an increasing dc current as illustrated by the regions of waveform 312 having a positive slope. When switch $SW_{resi}$ is open, stored energy in inductor $L_{resi}$ flows through flywheel diode $D_{resi}$ to control the average magnitude of DC current supplied to the input of inverter 108b.

Figure 15A:
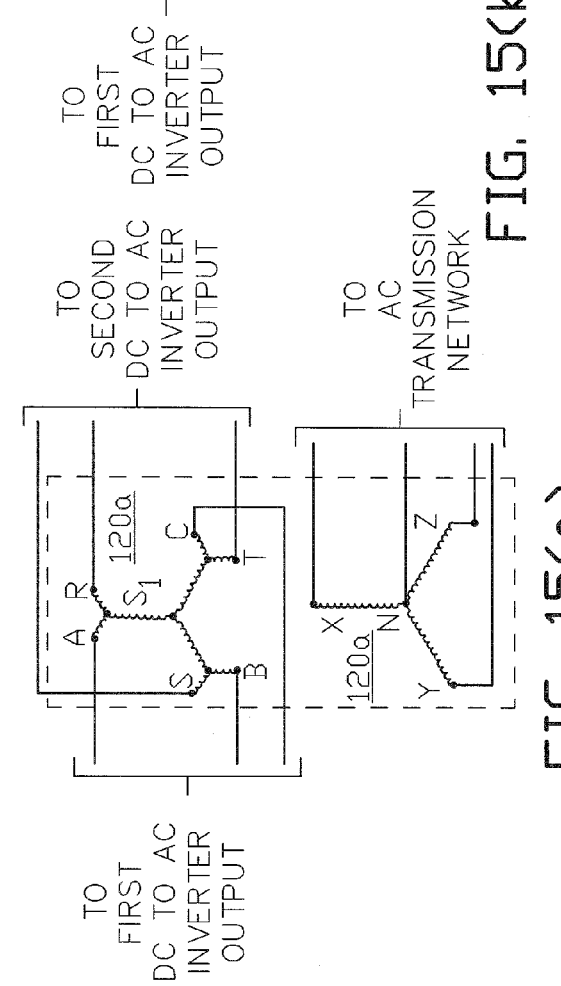
FIG. 15(a) through FIG. 15(c) illustrate three non-limiting examples of phase shifting transformation networks that may be used in the present invention.
Figure 15B:
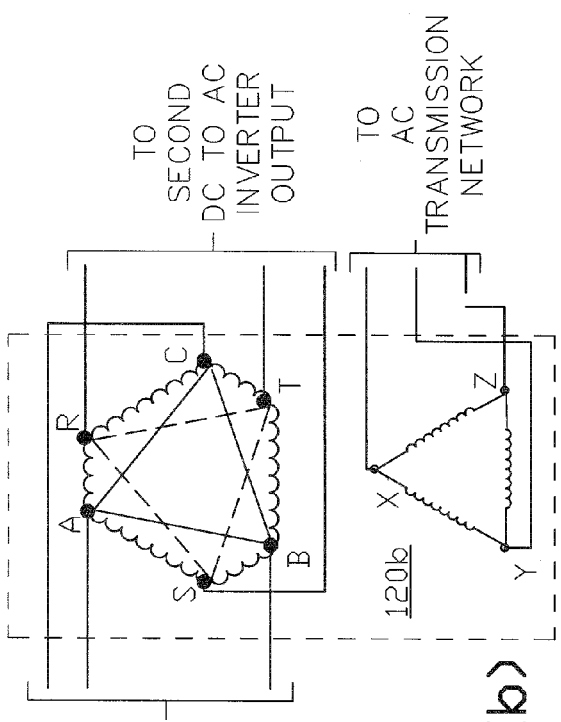
Figure 15C:
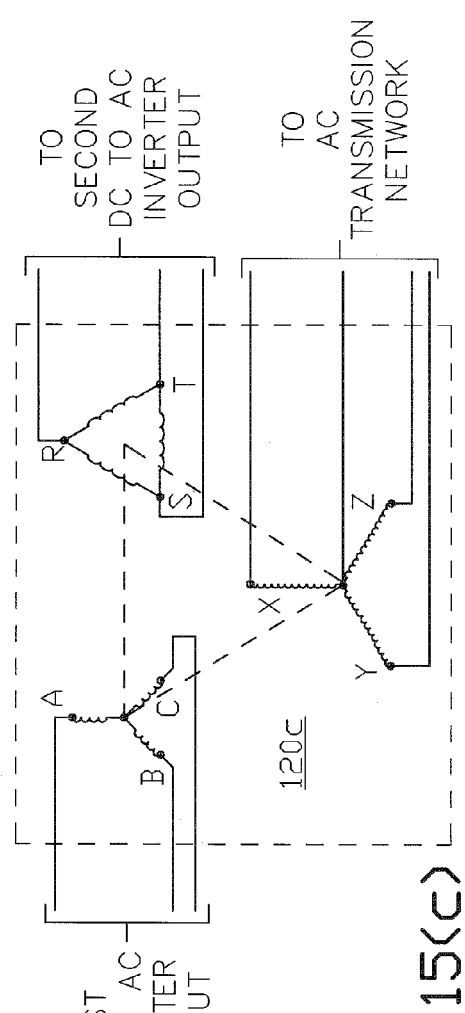
Figure 16:
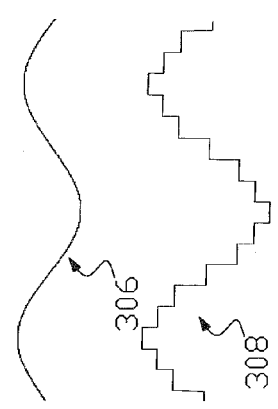
FIG. 16 illustrates a typical AC output from the primary windings of the phase shifting transformation network shown in FIG. 14.

In this non-limiting example of the invention, the outputs of a pair of the three-phase, AC regulated current source inverters 108 are connected to a six-phase-to-three-phase transformation network $120_1$ through $120_n$, where "n" is equal to one-half of the total quantity ("m") of regulated current source inverters. The three phase AC outputs from each transformation network 120 are suitably connected in parallel to AC grid 122. With reference to the transformation network, the term "primary" is used to refer to the windings of a transformer that are connected to the power grid, and the term "secondary" is used to refer to the windings of a transformer that are connected to the outputs of the regulated current source inverters used in the particular example of the invention. Three examples of six-phase-to-three phase (phase shifting) transformation networks suitable for the present invention are respectively represented in FIG. 15(a), FIG. 15(b) and FIG. 15(c) as transformation networks 120a, 120b and 120c. Utilization of such phase shifting transformation networks results in a stepped three phase current output from the primary windings of the transformer for injection into grid 122, which controls the harmonic content of the current injected into the grid. For example waveforms 306 and 308 in FIG. 16 are representative of the output voltage and current, respectively, from the primary windings of transformation network 120a shown in FIG. 15(a). Reference is made to U.S. patent application Ser. No. 12/325,187, which is incorporated herein by reference in its entirety, for other arrangements of regulated current source inverters and transformation networks that may be utilized in other examples of the present invention.

Figure 1A:
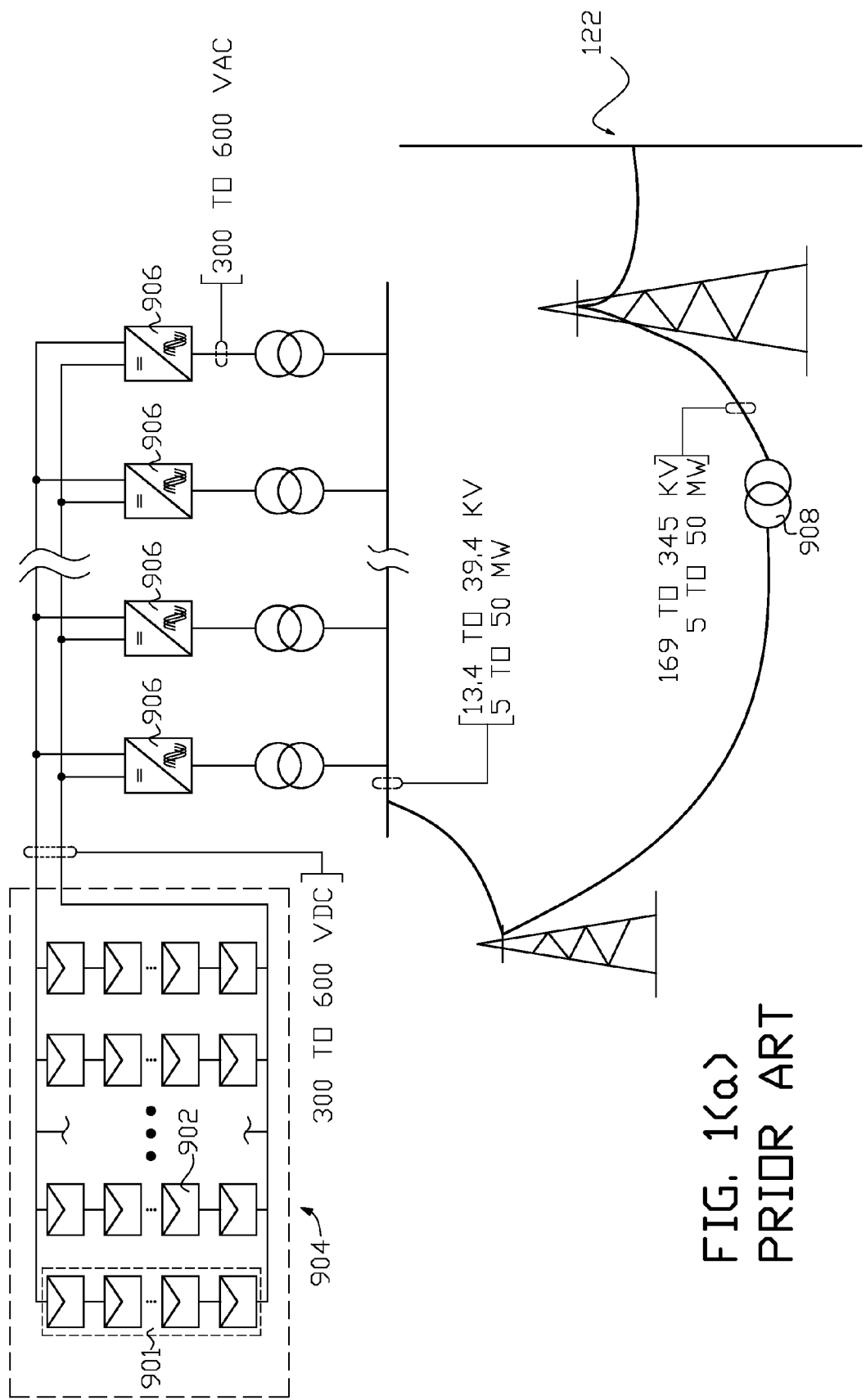
FIG. 1(a) is a simplified diagrammatic representation of one example of a known arrangement of apparatus for solar photovoltaic power collection, conversion and connection to a transmission grid.
Figure 1B:
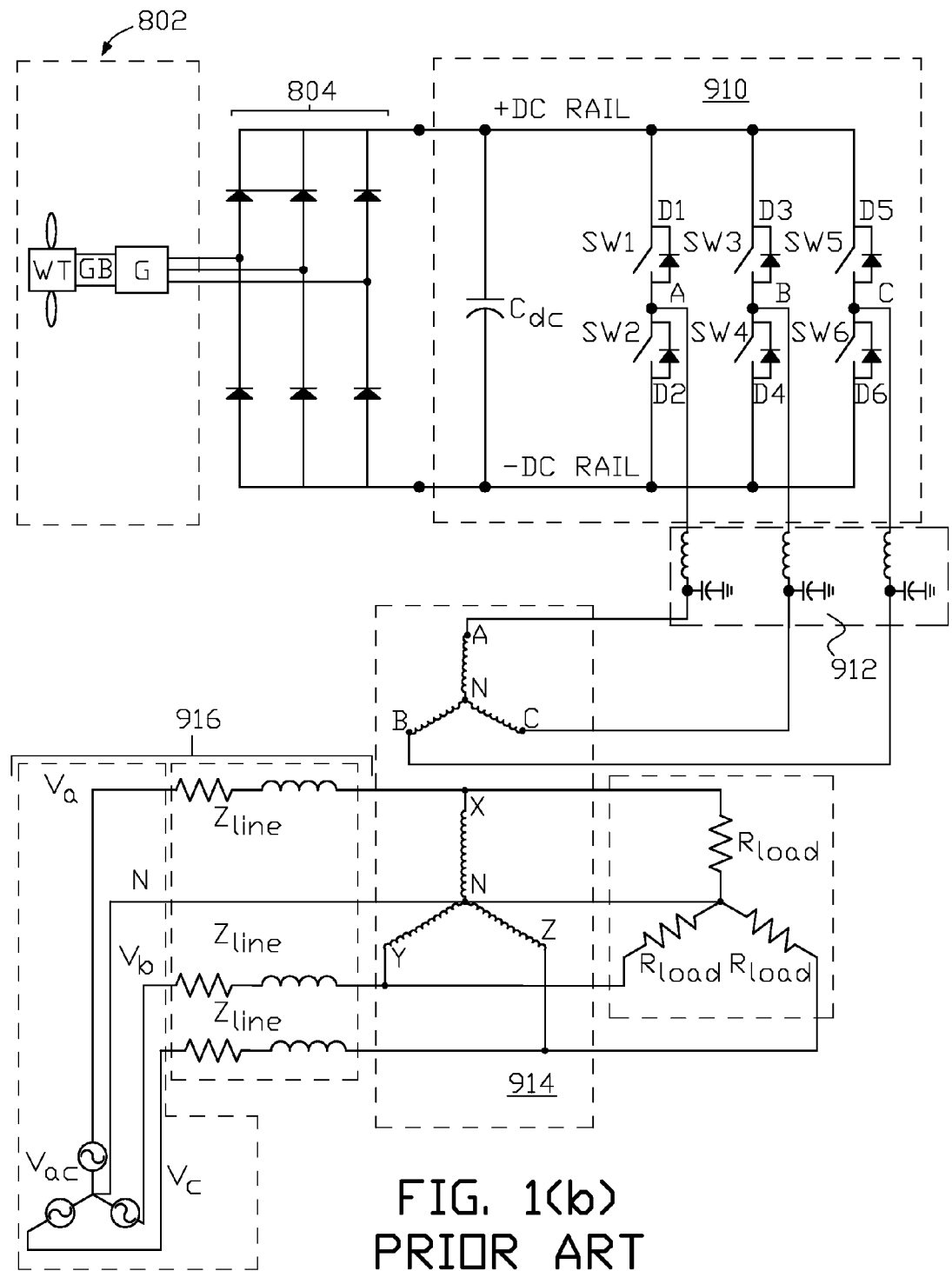
FIG. 1(b) is a schematic diagram of a typical industry designated Type 4 wind turbine driven generator power system.
Figure 1C:
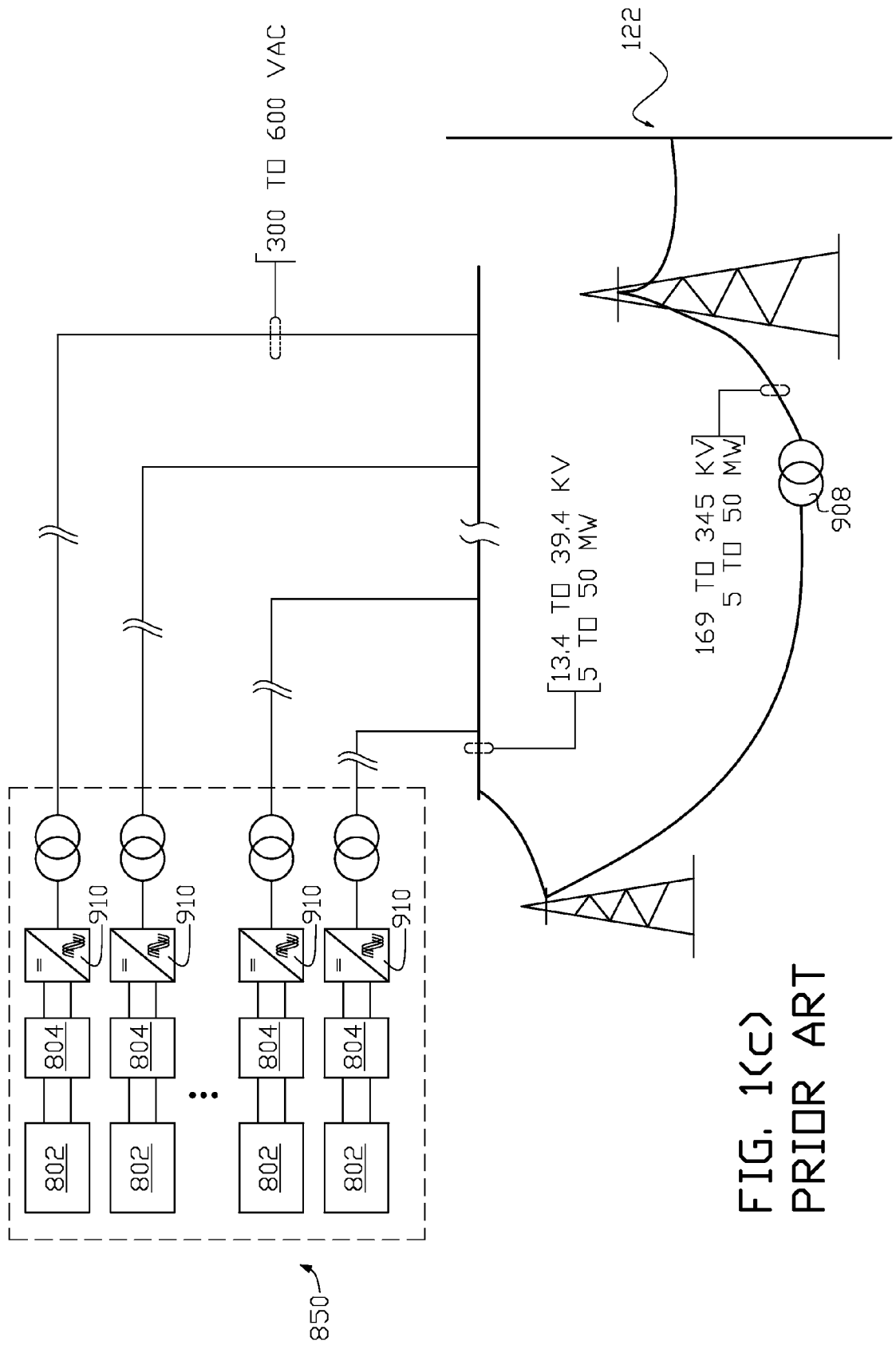
FIG. 1(c) is a simplified diagrammatic representation of one example of a known arrangement of apparatus for wind-generated electric power collection, conversion and connection to a transmission grid.
Figure 4:
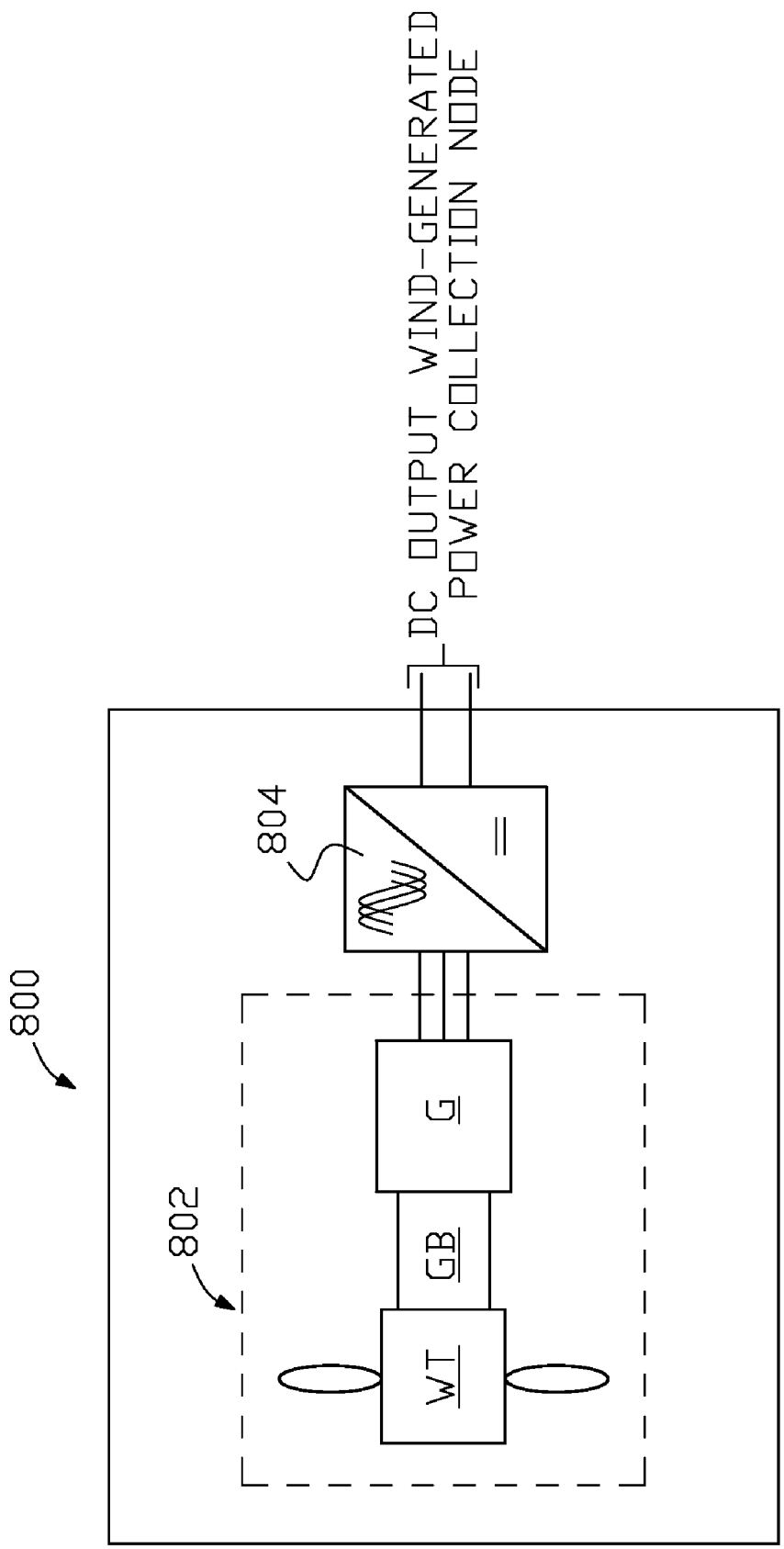
FIG. 4 is one example of a wind-generated electric power collection node utilized in some examples of the invention.

As shown in FIG. 4 the wind-generated power collection node 800 comprises wind turbine WT, gearbox GB and generator G, where the generator is an AC synchronous generator as utilized in the Type 4 wind turbine power system shown in FIG. 1(b) and a AC to DC rectifier 804 that converts the AC output of the generator into DC power. The output of wind-generated power collection node 800 is inputted to node-isolated step-down current regulator 106. The node-isolated step-down current regulator can be similar in design and operation as the step-down current regulators used in the photovoltaic-generated DC power collection described above. With this arrangement the step-down current regulator provides node isolation from the high voltage DC transmission link, and variable control of the node voltage and current can be achieved by controlling variables of the wind-generated DC power source and/or with the step-down current regulation so that the power collection node operates at its MPP.

Figure 3:
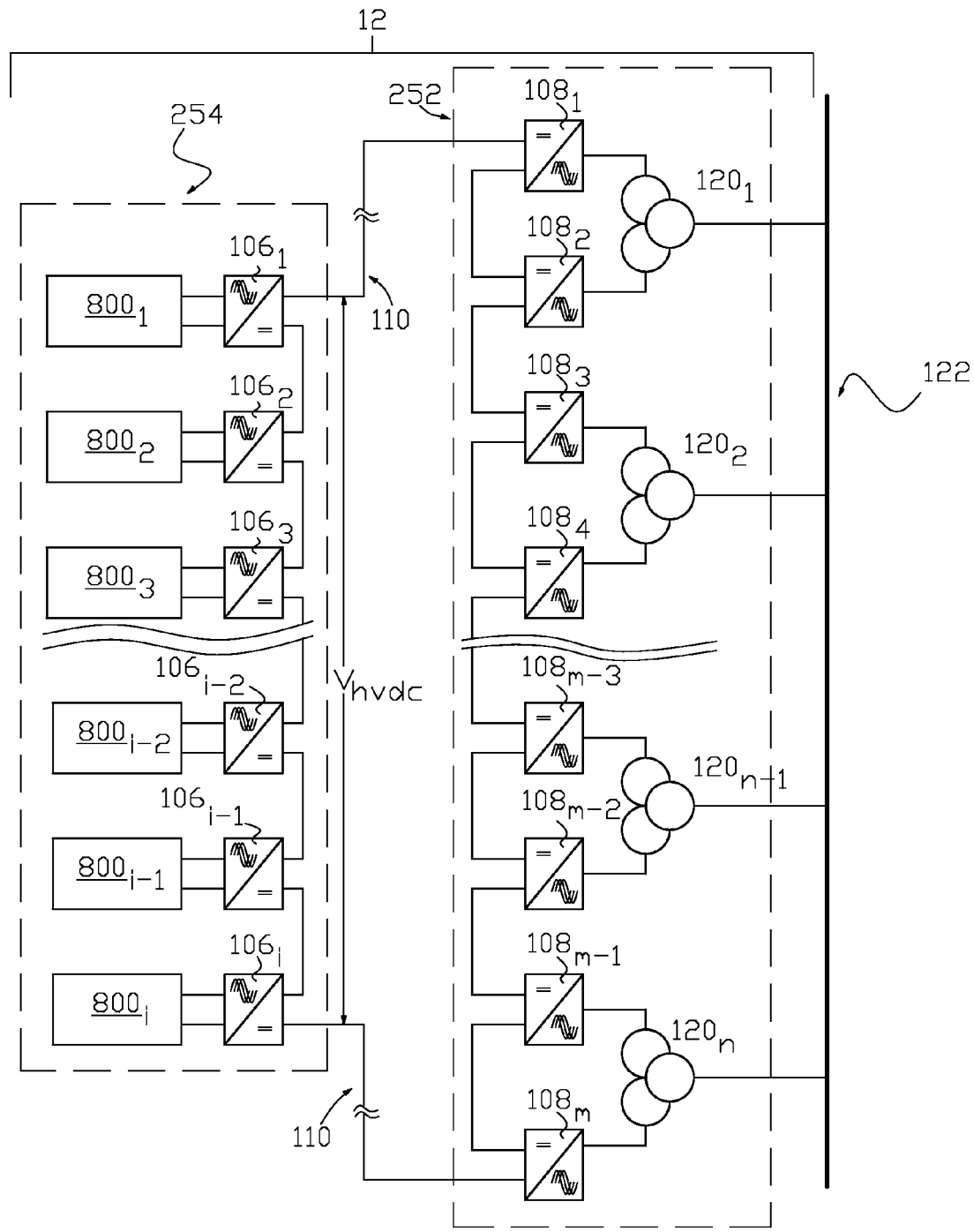
FIG. 3 is one example of an arrangement of apparatus of the present invention for wind-generated DC power collection, conversion of the collected DC power to AC power, and supply of the AC power to an AC transmission network or grid.

As shown in FIG. 3, the DC outputs of all node-isolated step-down current regulator $106_1$ through $106_i$ are connected in a series array to form a high voltage DC source that is fed into the inputs of the series of regulated current source inverters $108_1$ through $108_m$, which can be similar to the inverters used in the previous embodiment of the invention shown in FIG. 2 and as described above. The output of each node-isolated step-down current regulator 106 in the series of node-isolated step-down current regulators is referenced to the summed output voltages of all preceding node-isolated step-down current regulators in the series. For example the output voltage of node-isolated step-down current regulator $106_3$ is added to the sum of the output voltages of node-isolated step-down current regulators $106_1$ and $106_2$. Since the outputs of the series of node-isolated step-down current regulators are connected in series, the output string current of all node-isolated step-down current regulators will be equal. Other examples of the invention may utilize different configurations of node-isolated step-down current regulators as long as the output of the collection node is variable DC power and electrical isolation of the wind-generated power source from the high voltage DC transmission link is provided.

The control system for each particular arrangement of a wind-generated power collection node regulates DC node power so that the DC output current $I_{w-node}$ of each node-isolated step-down current regulator 106 is held relatively constant in magnitude (common string current), while the DC output (node) voltage $V_{w-node}$ varies in accordance with the node's control parameters. All node-isolated step-down current regulators 106 associated with collection nodes 800 have their outputs connected together in series as shown in FIG. 3, and supply DC power to the inputs of regulated current source inverters (RCSI) $108_1$ through $108_m$, with all of the RCSI inputs connected together in series via high voltage DC transmission link 110, which can be similar to that for the embodiment of the invention shown in FIG. 2 and as described above. Operation and arrangement of regulated current source inverters $108_1$ through $108_m$, and transformation networks $120_1$ through $120_n$ can be similar to that for the embodiment of the invention shown in FIG. 2 and as described above.

Figure 5:
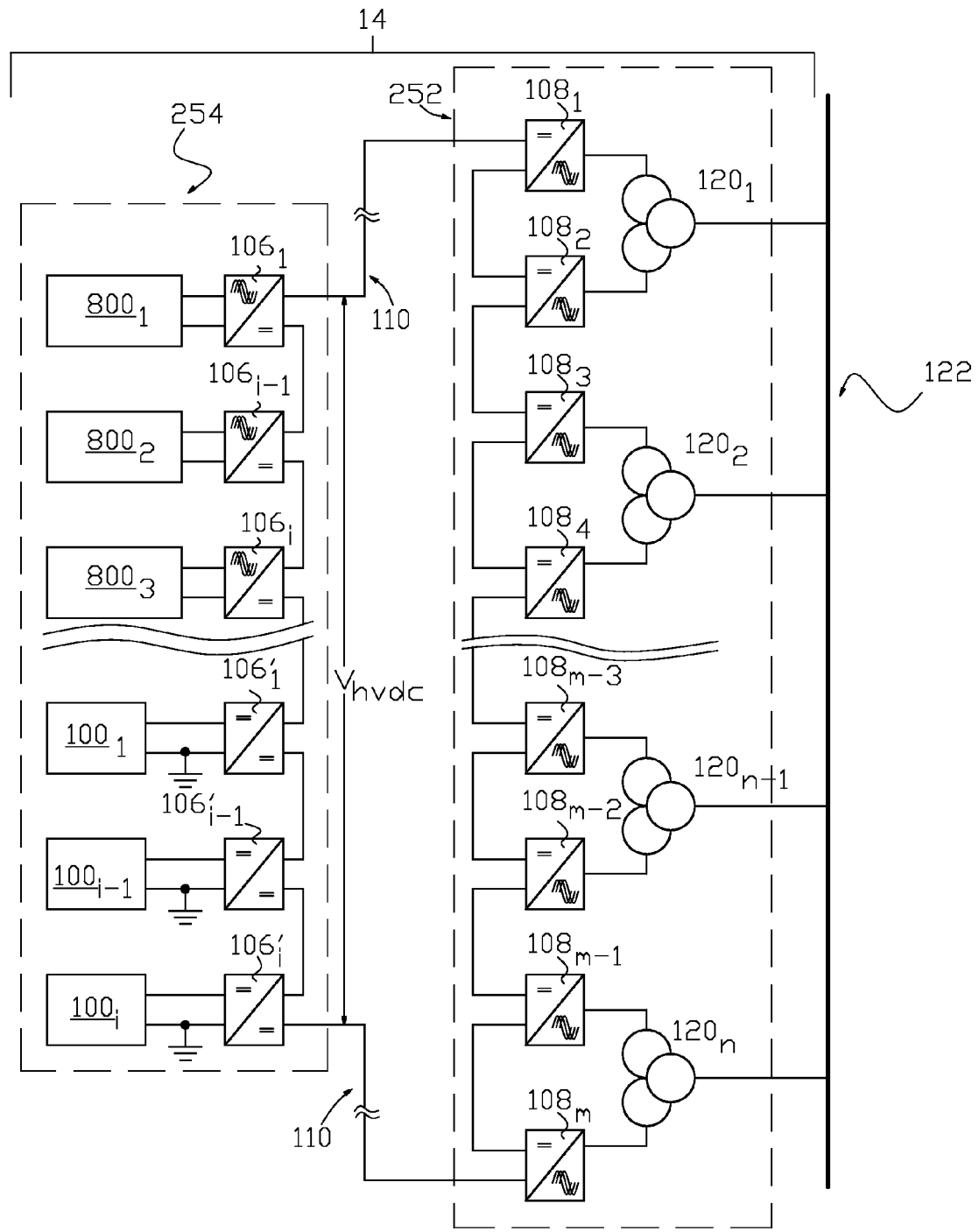
FIG. 5 is one example of an arrangement of apparatus of the present invention for the combination of photovoltaic-generated and wind-generated DC power collection, conversion of the collected DC power to AC power, and supply of the AC power to an AC transmission network or grid.

FIG. 5 illustrates another embodiment of an arrangement of apparatus 14 of the present invention for the combination of wind-generated and photovoltaic-generated DC power collection, conversion to AC power, and supply of the AC power to a transmission network. Each wind-generated power collection node $800_1$ through $800_i$ can be similar to the collection nodes shown in FIG. 4. Each photovoltaic-generated regulated power collection node can be similar to those shown in FIG. 2, and can comprise solar power collection node $100_1$ through $100_i$ with respective node-isolated step-down current regulator $106'_1$ through $106'_i$ as described above. The outputs of all wind-generated power collection nodes and photovoltaic-generated regulated power collection nodes are connected to the inputs of respective node-isolated step-down current regulators $106_1$ through $106_i$. and the outputs of node-isolated step-down current regulators $106_1$ through $106_i$ are connected in a series array to provide a higher DC voltage level that is fed, via high voltage DC transmission link 110, into the inputs of the series of regulated current source inverters $108_1$ through $108_m$, which can be similar to the inverters used in the previous examples of the invention. Operation and arrangement of regulated current source inverters $108_1$ through $108_m$, and transformation networks $120_1$ through $120_n$ can be similar to that for the embodiments of the invention described above. The embodiment of the invention shown in FIG. 5 where there is power collection from a combination of wind-generated and photovoltaic-generated DC sources, conversion to AC power, and supply of the AC power to a transmission network is of particular value for power collection from renewable energy sources over an entire day since photovoltaic energy is a sunlight source of power, whereas wind-generated energy is typically a nocturnal peaking source of power.

Figures 17, 18:
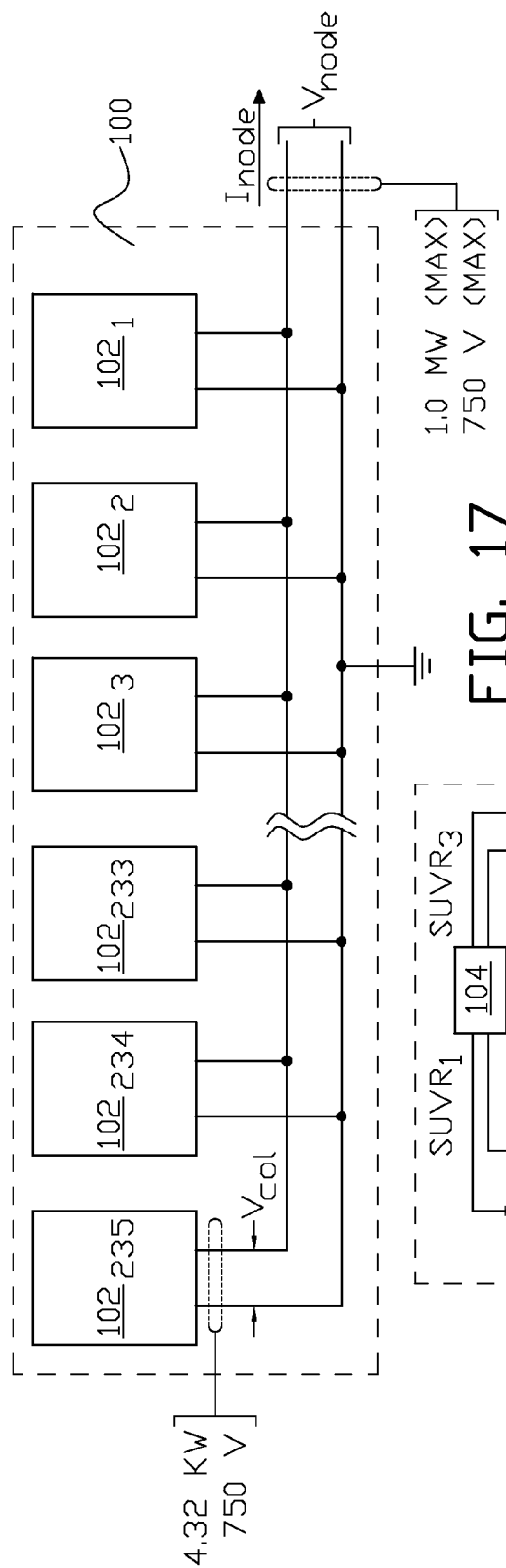
FIG. 17 illustrates a plurality of solar power collectors forming a solar power collection node used in one example of the invention.
FIG. 18 is a simplified electrical schematic of a solar power collector used in one example of the invention.
Figure 19:
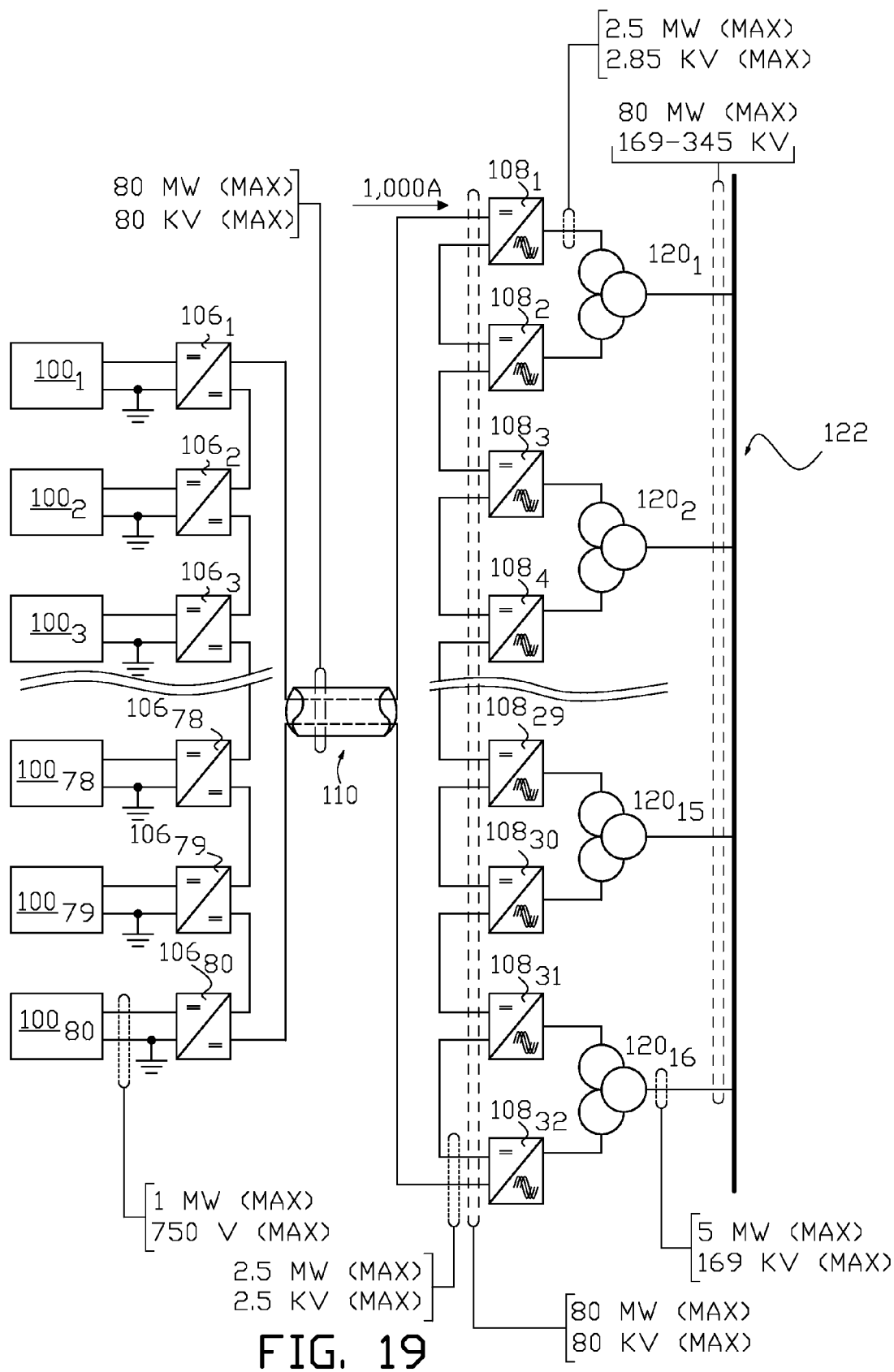
FIG. 19 is an arrangement of apparatus used in one example of the present invention for solar photovoltaic DC power collection, conversion of the collected DC power to AC power, and supply of AC power to an AC electric transmission network.

FIG. 17, FIG. 18 and FIG. 19 illustrate one non-limiting example of the present invention. In FIG. 17 each solar PV module, for example module $101a_1$, comprises an assembly of solar cells electrically arranged to convert photovoltaic solar power into DC power preferably within the range of about 216 watts (W) at 31 volts DC; this rating can be achieved, for example, from a series connection of approximately 60 solar cells in each solar PV module 101, with each cell producing about 6 amperes at 0.515 volts DC when operating at the MPP. Each solar PV power collector 102 may comprise around 20 solar PV modules in this example. In FIG. 17, 235 solar power collectors ($100_1$ through $100_{235}$) have their outputs connected together in parallel to form a solar collection node 100. The duty cycle, Δ, of SUVR 104 is varied, for example, as described above, so that each solar PV power collector operates at the MPP and each solar power collector produces around 1 megawatt of power. The preferred equalized DC output voltage of each solar power collector for this example is approximately 750 volts. More generally, in the present invention, each solar power collector functioning as a high voltage DC source of solar photovoltaic power can have a DC source output voltage of at least 15 kilovolts. Therefore the output of a solar power collection node in this example can deliver up to about a maximum of 1 megawatt at 750 volts DC. However the instantaneous output current of each collection node can fluctuate, for example between about 10 and 1,333 amperes, depending on the magnitude of incident illumination (irradiation level) on the solar cells making up the solar PV modules in the solar power collectors, which in turn, comprise a solar collection node. One or more of the solar PV power collectors may optionally be mounted on suitable tracker apparatus, for example, dual axis tracker apparatus to increase the annual amount of generated DC power by approximately 36 percent over that achievable with a fixed mount solar PV power collector. Referring to FIG. 19 there are 80 solar power collection nodes in this example. At rated maximum output, these 80 solar power collection nodes 100 will generate a total of 80 megawatts of power at 80 kilovolts DC. Therefore, in this example, HVDC transmission links 110 should be rated at 1000 amperes. During periods of minimal incident illumination on the solar cells in the solar power collection nodes, caused, for example, by sun shading by clouds, power can drop to approximately 1 megawatt at 80 kilovolts for a current of 12.5 amperes. In this example the output of each regulated current source inverter 108 will be approximately 2.5 megawatts at 2.5 kilovolts, and transformation networks 120 can be selected so that 5 megawatts of maximum power in the range of 169 to 345 kilovolts is delivered to grid 122 from each transformation network.

Figure 20:
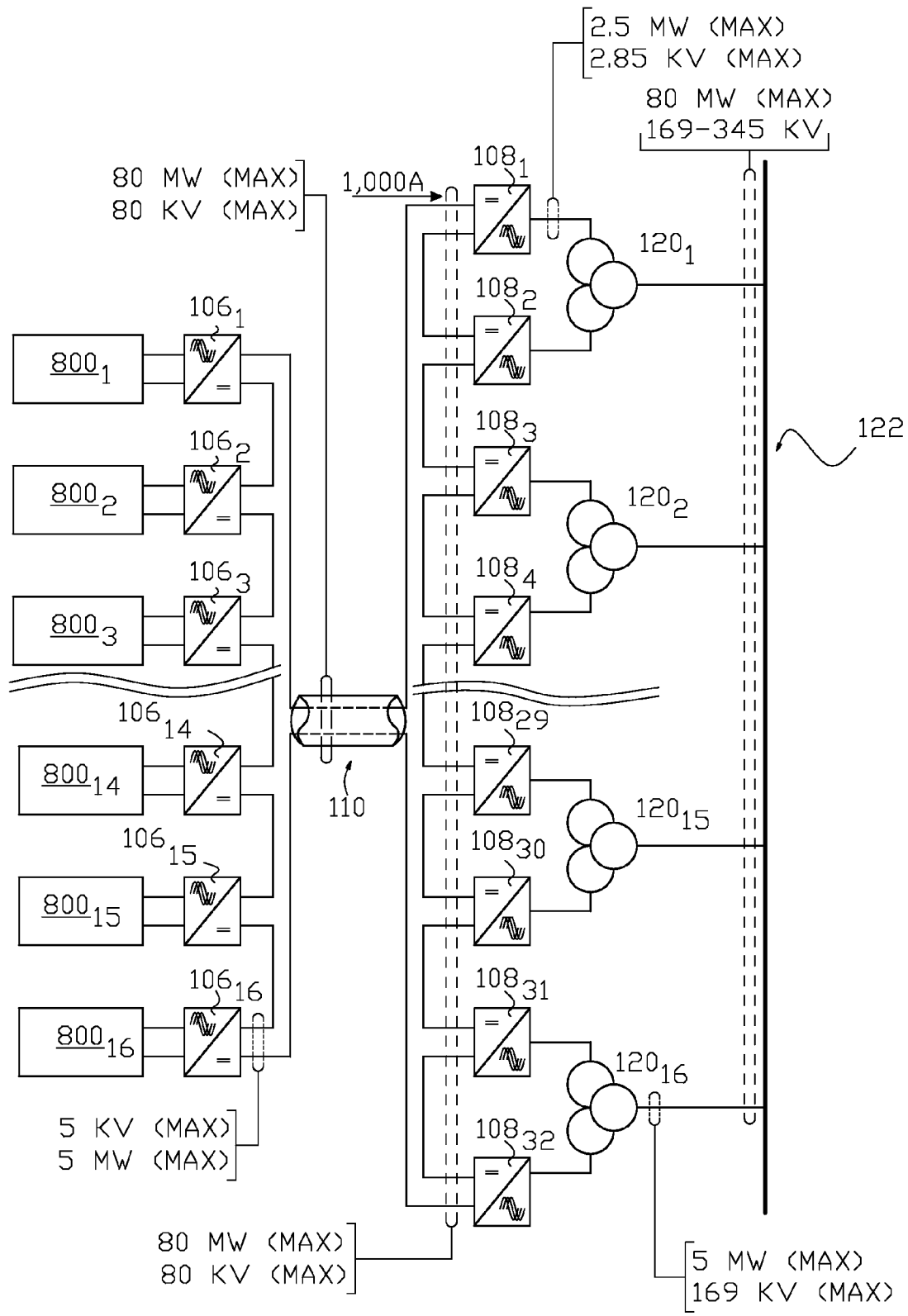
FIG. 20 is an arrangement of apparatus used in one example of the present invention for wind-generated DC power collection, conversion of the collected DC power to AC power, and supply of AC power to an AC electric transmission network.

FIG. 20 illustrates another example of the present invention where all renewable energy DC power sources are wind-generated power collection nodes 800 as shown in FIG. 3. In FIG. 20 with wind-generated power collection node 800 as shown in FIG. 4, each wind-generated power collector node produces around 5 megawatts of maximum power at 5 kilovolts. Referring to FIG. 20 there are 16 wind-generated power collection nodes in this example. At rated maximum output, these 16 wind-generated power collection nodes 800 will generate a total of 80 megawatts of power at 80 kilovolts DC. Therefore, in this example, HVDC transmission links 110 should be rated at 1,000 amperes. During periods of minimal wind velocity power can drop to approximately 1 megawatt at 80 kilovolts for a current of 12.5 amperes. In this example the output of each regulated current source inverter 108 will be approximately 2.5 megawatts at 2.5 kilovolts, and transformation networks 120 can be selected so that the 5 megawatts of maximum power in the range of 169 to 345 kilovolts is delivered to grid 122 from each transformation network.

Figure 21:
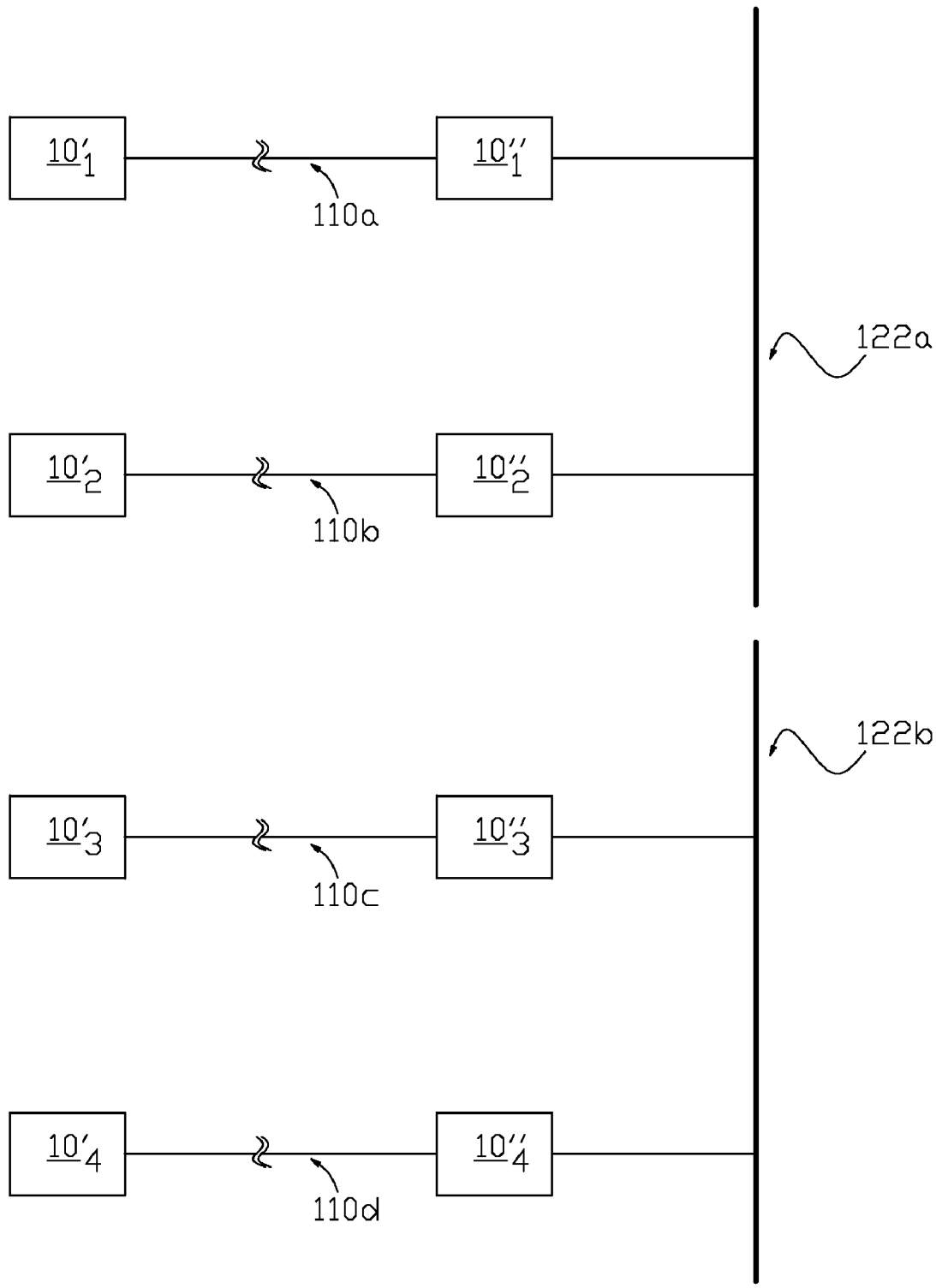
FIG. 21 is an arrangement of apparatus used in another example of the present invention for solar photovoltaic DC power collection, conversion of the collected DC power to AC power, and supply of AC power to an AC electric transmission network.

As illustrated in FIG. 21 multiple solar PV power collection sites, $10'_1$ through $10'_4$, where each site, for example site $10'_1$, represents solar power collection site 250 comprising solar power collection nodes $100_1$ through $100_i$ and node-isolated step-down current regulators $106_1$ through $106_i$ in FIG. 2, can be respectively connected via HVDC transmission links $110a$ through $110d$ to power conversion stations $10''_1$ through $10''_4$, where each station, for example station $10''_1$ represents power conversion station 252 comprising regulated current source inverters $108_1$ through $108_m$ and phase shifting transformation networks $120_1$ through $120_n$ in FIG. 2 for connection to AC grids $122a$ and $122b$, which may, or may not, be interconnected. As in other examples of the invention, since transmission links $110a$ through $110d$ are high voltage DC links, each multiple solar photovoltaic collection site ($10'_1$ through $10'_4$) may be located at significant distances from their respective power conversion stations and AC grid tie-ins.

Figure 22:
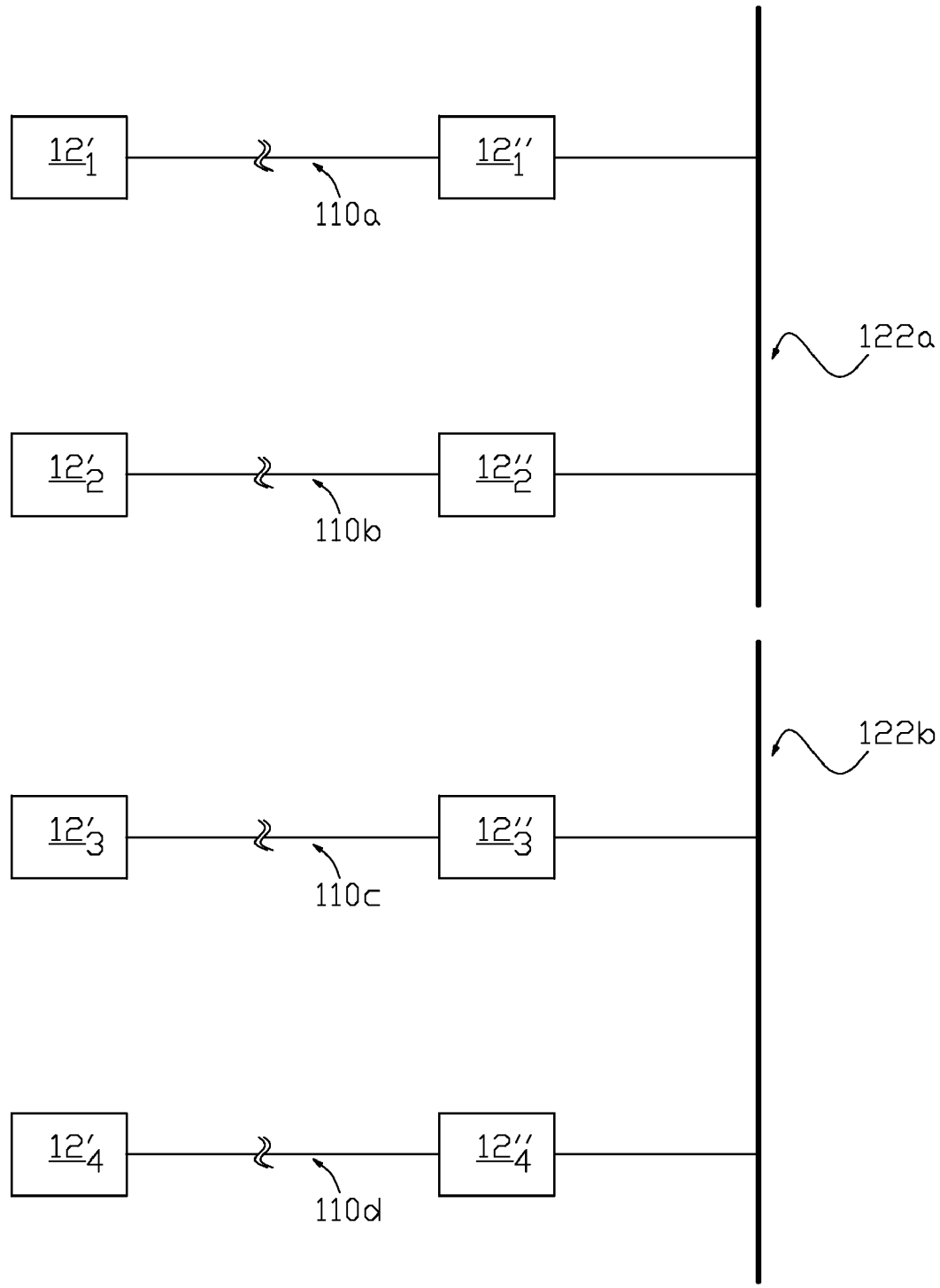
FIG. 22 is an arrangement of apparatus used in another example of the present invention for wind-generated DC power collection, conversion of the collected DC power to AC power, and supply of AC power to an AC electric transmission network.

Alternative to the embodiment of the invention shown in FIG. 22, multiple wind-generated power collection sites, $12'_1$ through $12'_4$, where each site, for example site $12'_1$, represents wind-generated power collection site 254 comprising wind-generated power collection node $800_1$ through $800_i$ in FIG. 3, can be respectively connected via HVDC transmission links $110a$ through $110d$ to power conversion stations $12''_1$ through $12''_4$, where each station, for example station $12''_1$ represents power conversion station 252 comprising regulated current source inverters $108_1$ through $108_m$ and phase shifting transformation networks $120_1$ through $120_n$ in FIG. 3 for connection to AC grids $122a$ and $122b$, which may, or may not, be interconnected. As in other examples of the invention, since transmission links $110a$ through $110d$ are high voltage DC links, each multiple wind-generated power collection site ($12'_1$ through $12'_4$) may be located at significant distances from their respective power conversion stations and AC grid tie-ins. Alternatively a combination of both multiple wind-generated power collection sites and photovoltaic-generated power collection sites may be connect to the HVDC transmission links as shown in FIG. 21 and FIG. 22.

A particular advantage of the present invention is that solar photovoltaic power, wind-generated power, or combination thereof, may be collected from a plurality of geographic regions that can extend over a large longitudinal distance so that the period of daily collection of solar photovoltaic power, wind-generated power, or combination thereof, into an AC grid (or interconnected AC grids) can be maximized as the Earth rotates and sunlit or high wind regions progress across the longitude. For example as shown in FIG. 23, a plurality of solar PV power collection sites, $250_1$ through $250_3$, each representing multiple groupings of solar power collection nodes and associated node-isolated step-down current regulator, may be physically located at three different locations $LONG_1$, $LONG_2$ and $LONG_3$ along the Earth's longitude with HVDC transmission link 110e interconnecting the three solar collection sites to conversion station 252, which can comprise two or more step-down regulated current source inverters and transformation networks for connection to grid 122c. The string current in each solar power collection site may be regulated to achieve equal voltage output from each site to allow parallel connection of sites. This extended physical range of a solar farm of the present invention is achievable utilizing the combination of high voltage solar power collectors with DC output voltage stabilization for the solar power collectors; collection node-isolated step-down current regulation; and HVDC transmission to a single DC-to-AC power conversion location. The analog arrangement for wind-generated power is shown in FIG. 24, where a plurality of wind-generated power collection sites, $254_1$ through $254_3$, each representing multiple groupings of wind-generated power collection nodes $800_1$ through $800_i$ in FIG. 3, may be physically located at three different locations.

A distributed monitoring and control system can be provided, for example, to set the duty cycles of all step-up voltage regulators and step-down current regulators, as described above, to achieve the MPP for each solar PV power collector (or wind-generated power collection node), and a regulated level of string current in each current collection node. For multiple PV power collection sites (or wind-generated power collection sites), equal voltage monitoring and control from each site can be implemented by one or more (redundant) suitable communication links, such as a wireless link, a wired link (for example, fiber optic lines) or carrier data signals on the HVDC transmission links. System parameters, such as total magnitude of collected DC power can be transmitted as inputs to the control circuitry for the plurality of regulated current source inverters.

Although regulated current source inverters are used in the above examples of the invention, other types of inventors may also be used. Although the AC outputs of two DC to AC inverters feed a single transformation network, other arrangements can be used in other examples of the invention. For example there may be one, or any number of inverters feeding a single transformation network to provide stepped three phase AC power to the grid.

The above examples of the invention have been provided merely for the purpose of explanation, and are in no way to be construed as limiting of the present invention. While the invention has been described with reference to various embodiments, the words used herein are words of description and illustration, rather than words of limitations. Although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto, and changes may be made without departing from the scope of the invention in its aspects.

The invention claimed is:

1. Apparatus for collecting at least one megawatt of wind-generated electric power and delivering the at least one megawatt of wind-generated power to an AC transmission network, the apparatus comprising:

a plurality of wind-generated power collection nodes, each one of the plurality of wind-generated power collection nodes comprising a wind turbine driven generator assembly having an AC synchronous generator with a generator output connected to an input of an AC to DC rectifier having a DC rectifier output;

a plurality of node isolated step-down current regulators, each one of the plurality of node isolated step-down current regulators having a node isolated step-down current regulator input connected exclusively to the DC rectifier output of one of the plurality of wind-generated power collection nodes;

a series string high voltage DC series circuit formed from a serial interconnection of a node isolated step-down current regulator output from each one of the plurality of wind-generator power collection nodes, the series string high voltage DC series circuit having an electric potential of at least 15 kilovolts;

a high voltage DC power transmission link having a first and a second end high voltage DC power transmission link terminations, the first end high voltage DC power transmission link termination connected across the series string high voltage DC series circuit;

a plurality of regulated current source inverters, each one of the plurality of regulated current source inverters having an inverter DC input and an inverter three phase AC output, the inverter DC input of each one of the plurality of regulated current source inverters series interconnected to form a series string inverter DC input circuit, the second end high voltage DC power transmission link termination connected across the series string inverter DC input circuit, the inverter three phase AC output of each one of the plurality of regulated current source inverters in voltage synchronization with the voltage of the AC transmission network, and each phase current of the inverter three phase AC output of each one of the plurality of regulated current source inverters having a stepped current waveform; and at least one phase shifting transformation network, each one of the at least one phase shifting transformation networks connecting the inverter AC outputs of the plurality of regulated current source inverters to the AC transmission network.

2. The apparatus of claim 1 wherein each of the at least one phase shifting transformation networks comprises one or more transformers, each one of the one or more transformers comprising a plurality of secondary and primary phase shifting windings, the plurality of secondary phase shift windings connected to the inverter AC output of the plurality of regulated current source inverters, and the plurality of primary phase shifting windings connected to the AC transmission network.

3. A method of collecting at least one megawatt of wind-generated DC electric power and delivering the at least one megawatt of wind-generated DC electric power to an AC transmission network, the method comprising the steps of:

generating the at least one megawatt of wind-generated DC electric power from a plurality of wind-generated power collection nodes, each one of the plurality of wind-generated power collection nodes comprising a wind turbine driven generator assembly having an AC synchronous generator with a generator output connected to an input of an AC to DC rectifier having a DC rectifier output;

connecting a plurality of node isolated step-down regulators to the DC rectifier outputs of each one of the plurality of wind-generated power collection nodes, a node isolated step-down current regulator input from each one of the plurality of node isolated step-down regulators connected exclusively to one of the DC rectifier outputs of the plurality of node isolated step-down regulators;

serially interconnecting a node isolated step-down current regulator output from each one of the plurality of wind-generated power collection nodes to form an interconnected high voltage DC series circuit having an electric potential of at least 15 kilovolts;

serially interconnecting an inverter DC input of each one of a plurality of regulated current source inverters to form a high voltage DC series string inverter DC input circuit;

transporting the at least one megawatt of wind-generated DC electric power from the interconnected high voltage DC series circuit to the high voltage DC series string inverter DC input circuit to form a high voltage DC power loop circuit;

converting the at least one megawatt of wind-generated DC electric power to AC electric power in each one of the plurality of regulated current source inverters to produce an inverter three phase AC output from each of the plurality of regulated current source inverters in voltage synchronization with the voltage of the AC transmission network, and each phase current of the inverter three phase AC output of each one of the plurality of regulated current source inverters having a stepped current waveform;

phase shifting the inverter three phase AC outputs from all of the plurality of regulated current source inverters to form an inverter phase shifted AC output current; and injecting the inverter phase shifted AC output current from the plurality of regulated current source inverters into the AC transmission network.

4. A method of delivering a megawatt quantity of DC electric power from a DC high voltage wind-generated electric power source to an AC transmission network, the method comprising the steps of:

generating the megawatt quantity of wind-generated DC electric power from a plurality of wind-generated power collection nodes, each one of the plurality of wind-generated power collection nodes comprising a wind turbine driven generator assembly having an AC synchronous generator with a generator output connected to an input of an AC to DC rectifier having an AC to DC rectifier output;

individually electrically isolating and step-down current regulating the AC to DC rectifier output of each one of the plurality of wind-generated power collection nodes;

forming an interconnected high voltage DC series circuit from all of the electrically isolated and step-down current regulated AC to DC rectifier outputs of the plurality of wind-generated power collection nodes, the interconnected high voltage DC series circuit having an electric potential of at least 15 kilovolts;

transporting the megawatt quantity of wind-generated DC electric power from the interconnected high voltage DC series circuit to a high voltage DC series string inverter DC input circuit formed from a serial interconnection of an inverter DC input of each one of a plurality of regulated current source inverters;

converting the megawatt quantity of wind-generated DC electric power to AC electric power in each one of the plurality of regulated current source inverters to produce an inverter three phase AC output from each of the plurality of regulated current source inverters in voltage synchronization with the voltage of the AC transmission network, and each phase current of the inverter three phase AC output from each one of the plurality of regulated current source inverters having a stepped current waveform;

phase shifting the inverter three phase AC outputs from all of the plurality of regulated current source inverters to form an inverter phase shifted AC output current; and injecting the inverter phase shifted AC output current from the plurality of regulated current source inverters into the AC transmission network whereby the megawatt quantity of DC electric power is delivered to the AC transmission network.

5. Apparatus for collecting at least one megawatt quantity of DC electric power from a combination of solar photovoltaic power and wind-generated power, and delivering the at least one megawatt quantity of DC electric power to an AC transmission network, the apparatus comprising:

a combination of a plurality of solar photovoltaic power collection nodes and a plurality of wind-generated power collection nodes, each one of the plurality of solar photovoltaic power collection nodes comprising a plurality of solar photovoltaic power collectors, each one of the plurality of solar photovoltaic power collectors comprising a plurality of solar photovoltaic modules interconnected in a series string circuit to an input of a dedicated solar collector step-up voltage regulator having a solar collector step-up voltage regulator output and each one of the plurality of wind-generated power collection nodes comprising a wind turbine driven generator assembly having an AC synchronous generator with a generator output connected to an input of an AC to DC rectifier having a DC rectifier output;

a plurality of node isolated step-down current regulators, each one of the plurality of node isolated step-down current regulators having a node isolated step-down current regulator input connected exclusively to the solar collector step-up voltage regulator output of each one of the plurality of solar photovoltaic power collection nodes and the DC rectifier output of one of the plurality of wind-generated power collection nodes;

a series string high voltage DC series circuit formed from a serial interconnection of a node isolated step-down current regulator output from each one of the plurality of solar photovoltaic power collection nodes and each one of the plurality of wind-generator power collection nodes, the series string high voltage DC series circuit having an electric potential of at least 15 kilovolts;

a high voltage DC power transmission link having a first and a second end high voltage DC power transmission link terminations, the first end high voltage DC power transmission link termination connected across the series string high voltage DC series circuit;

a plurality of regulated current source inverters, each one of the plurality of regulated current source inverters having an inverter DC input and an inverter three phase AC output, the inverter DC input of each one of the plurality of regulated current source inverters series interconnected to form a series string inverter DC input circuit, the second end high voltage DC power transmission link termination connected across the series string inverter DC input circuit, the inverter three phase AC output of each one of the plurality of regulated current source inverters in voltage synchronization with the voltage of the AC transmission network, and each phase current of the inverter three phase AC output of each one of the plurality of regulated current source inverters having a stepped current waveform; and at least one phase shifting transformation network, each of the at least one phase shifting transformation networks connecting the inverter AC outputs of the plurality of regulated current source inverters to the AC transmission network.

6. A method of collecting at least one megawatt quantity of DC electric power from a combination of solar photovoltaic power and wind-generated power and delivering the at least one megawatt quantity of DC electric power to an AC transmission network, the method comprising the steps of:

generating the at least one megawatt quantity of DC electric power from a combination of one or more solar photovoltaic power collection nodes and one or more wind-generated power collection nodes, each of the one or more solar photovoltaic power collection nodes comprising a plurality of solar photovoltaic power collectors, each one of the plurality of solar photovoltaic power collectors comprising a plurality of solar photovoltaic modules interconnected in a series string circuit to an input of a dedicated solar collector step-up voltage regulator having a solar collector step-up voltage regulator output, and each one of the one or more wind-generated power collection nodes comprising a wind turbine driven generator assembly having an AC synchronous generator with a generator output connected to an input of an AC to DC rectifier having a DC rectifier output;

connecting a plurality of node isolated step-down regulators to the solar collector step-up voltage regulator outputs of each one of the one or more solar photovoltaic power collection nodes and the DC rectifier outputs of each one of the one or more wind-generated power collection nodes, a node isolated step-down current regulator input from each one of the plurality of node isolated step-down regulators connected exclusively to one of the solar collector step-up voltage regulator outputs of the one or more solar photovoltaic power collection nodes and exclusively to one of the DC rectifier outputs of the one or more wind-generated power collection nodes;

serially interconnecting a node isolated step-down current regulator output from each of the one or more solar photovoltaic power collection nodes and the one or more wind-generated power collection nodes to form an interconnected high voltage DC series circuit having an electric potential of at least 15 kilovolts;

serially interconnecting an inverter DC input of each one of a plurality of regulated current source inverters to form a high voltage DC series string inverter DC input circuit; and transporting the at least one megawatt quantity of solar photovoltaic and wind-generated DC electric power from the interconnected high voltage DC series circuit to the high voltage DC series string inverter DC input circuit to form a high voltage DC power loop circuit;

converting the at least one megawatt quantity of solar photovoltaic and wind-generated DC power to AC electric power in each one of the plurality of regulated current source inverters to produce an inverter three phase AC output from each of the plurality of regulated current source inverters in voltage synchronization with the voltage of the AC transmission network, and each phase current of the inverter three phase AC output of each one of the plurality of regulated current source inverters having a stepped current waveform;

phase shifting the inverter three phase AC outputs from all of the plurality of regulated current source inverters to form a phase shifted AC output current; and injecting the phase shifted AC output current from the plurality of regulated current source inverters into the AC transmission network.

* * * * *